Nov. 20, 1945.  G. C. CHASE  2,389,182
LISTING CALCULATOR
Filed Nov. 19, 1940  14 Sheets-Sheet 2

Witness
Elmer W. Edwards

INVENTOR
George C. Chase
BY
Stuart Hild, ATTORNEY

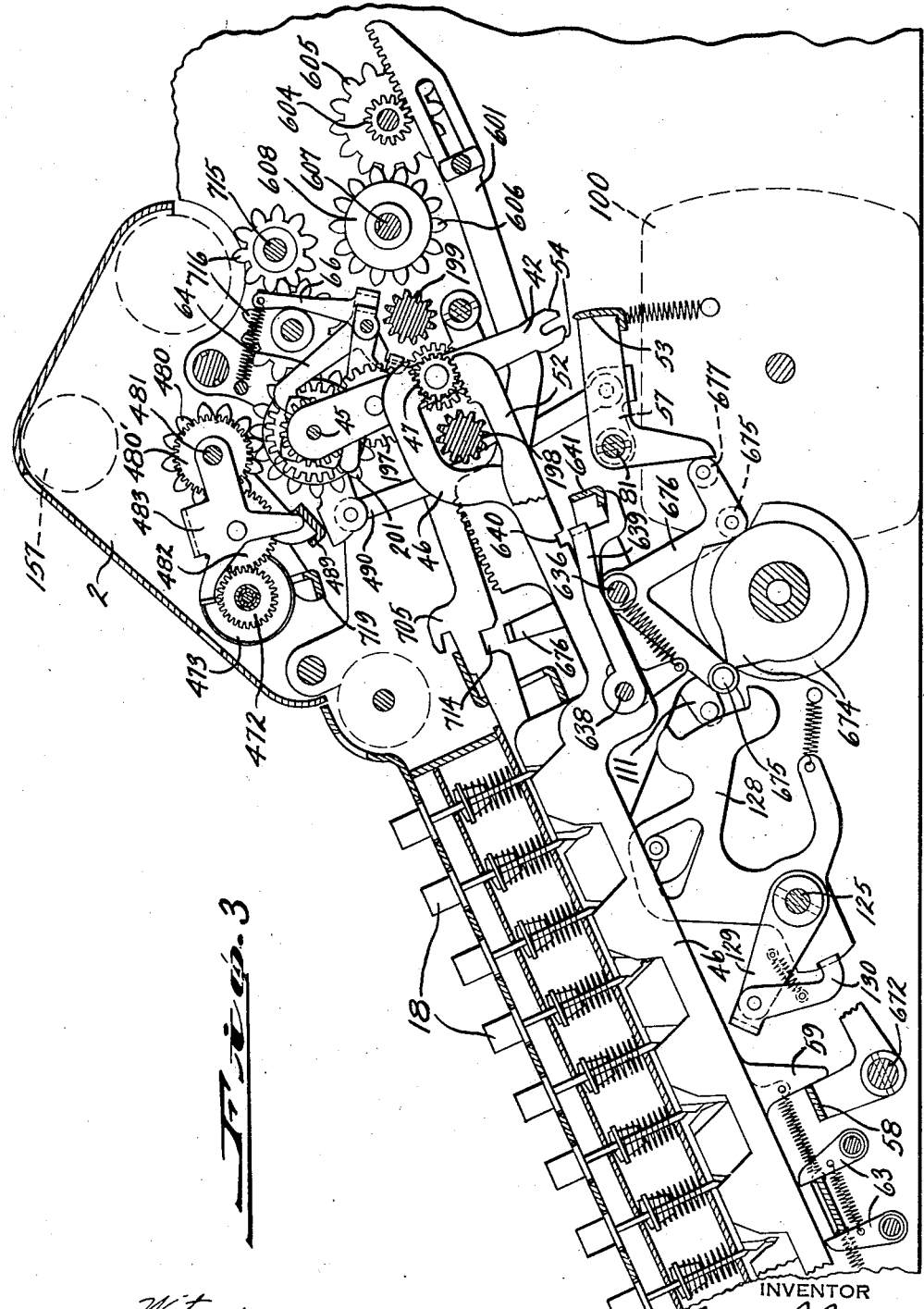

Nov. 20, 1945.  G. C. CHASE  2,389,182
LISTING CALCULATOR
Filed Nov. 19, 1940   14 Sheets-Sheet 4
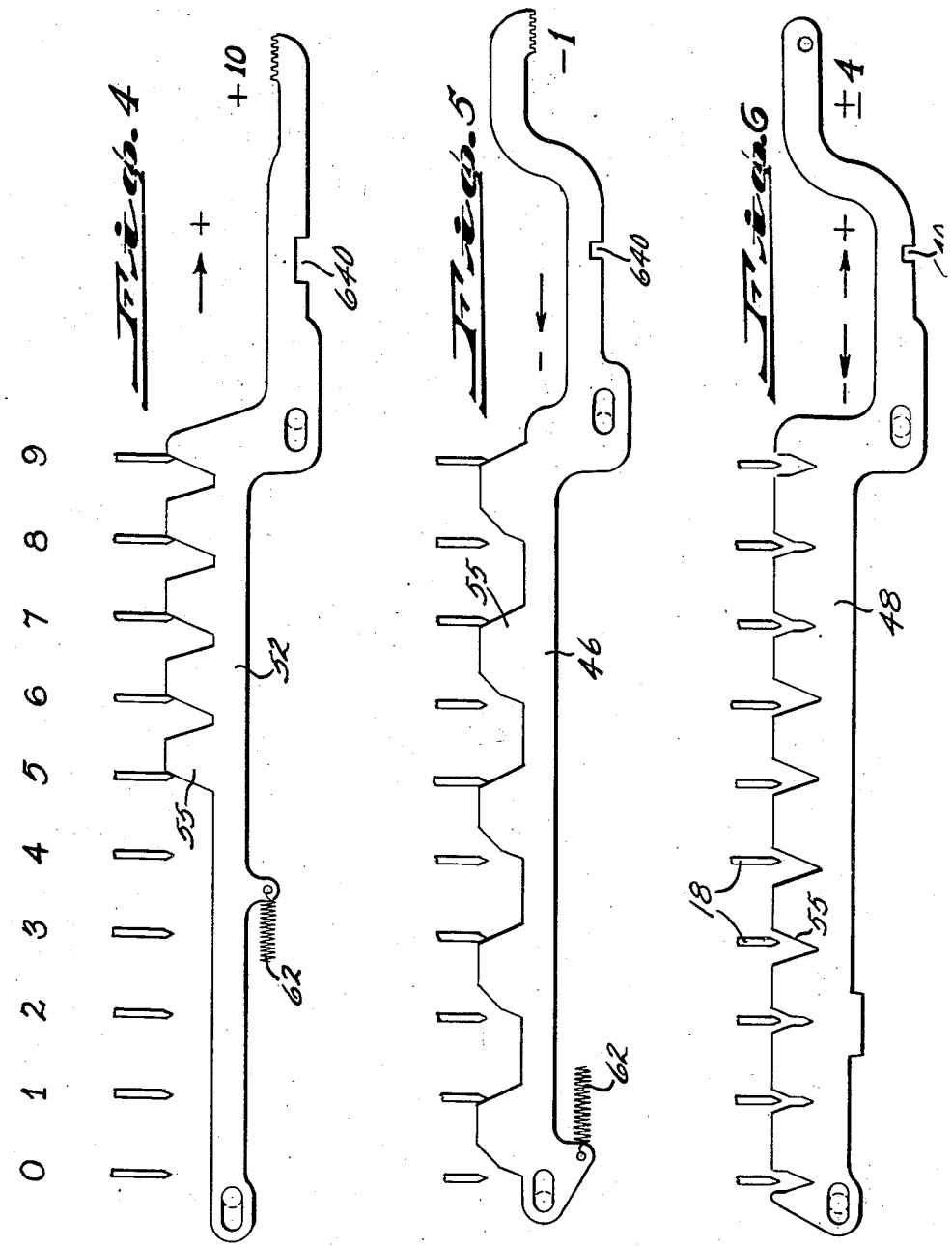

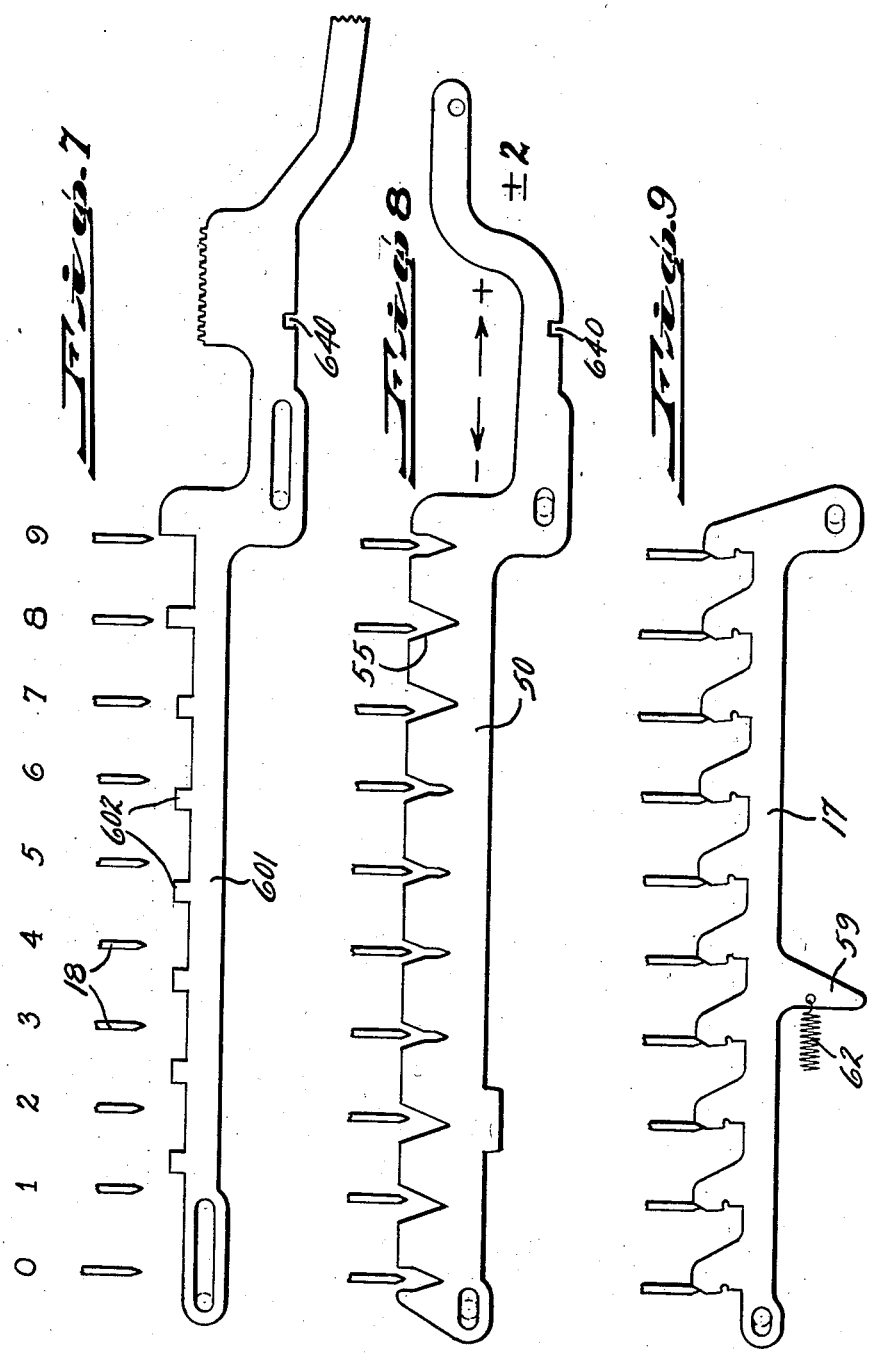

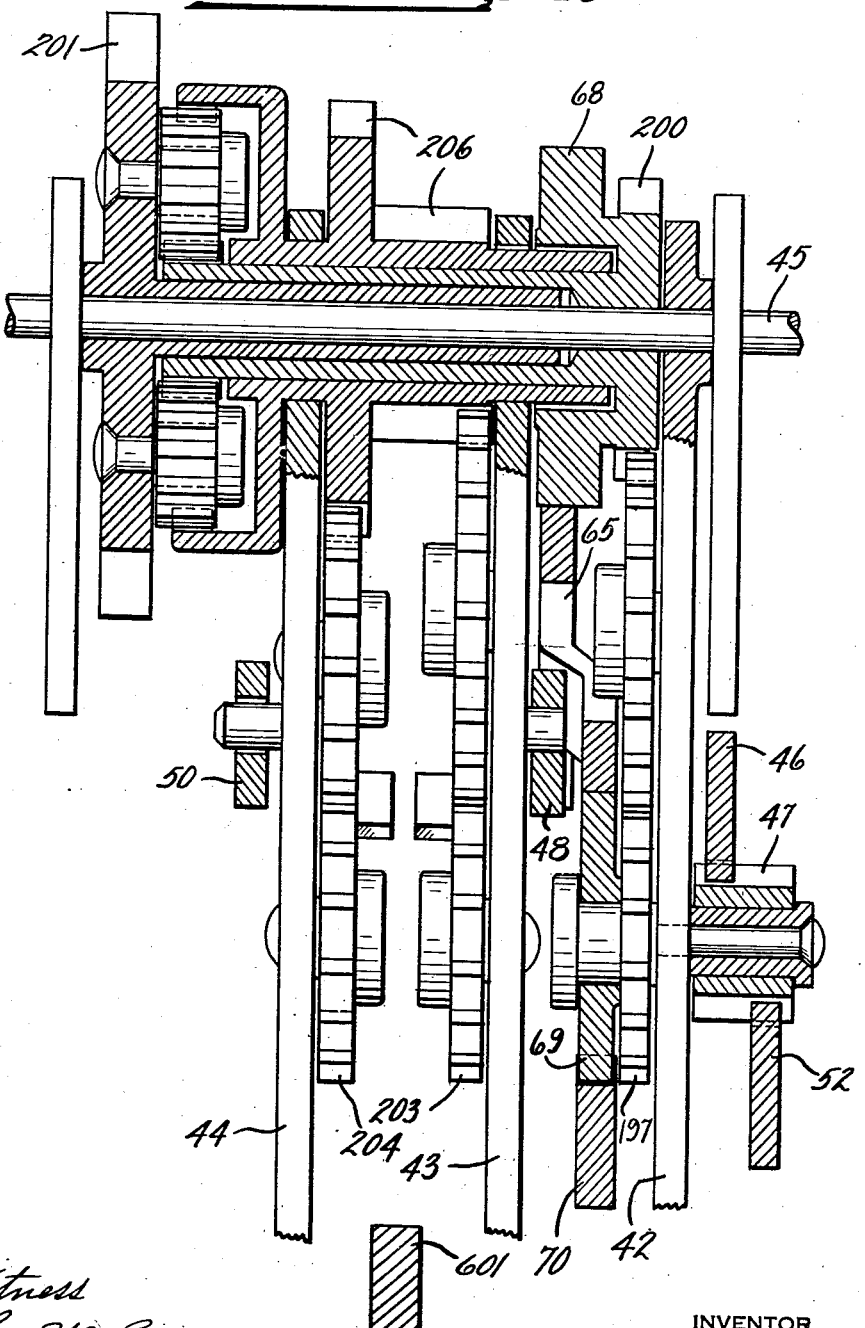

Nov. 20, 1945.    G. C. CHASE    2,389,182
LISTING CALCULATOR
Filed Nov. 19, 1940    14 Sheets-Sheet 7
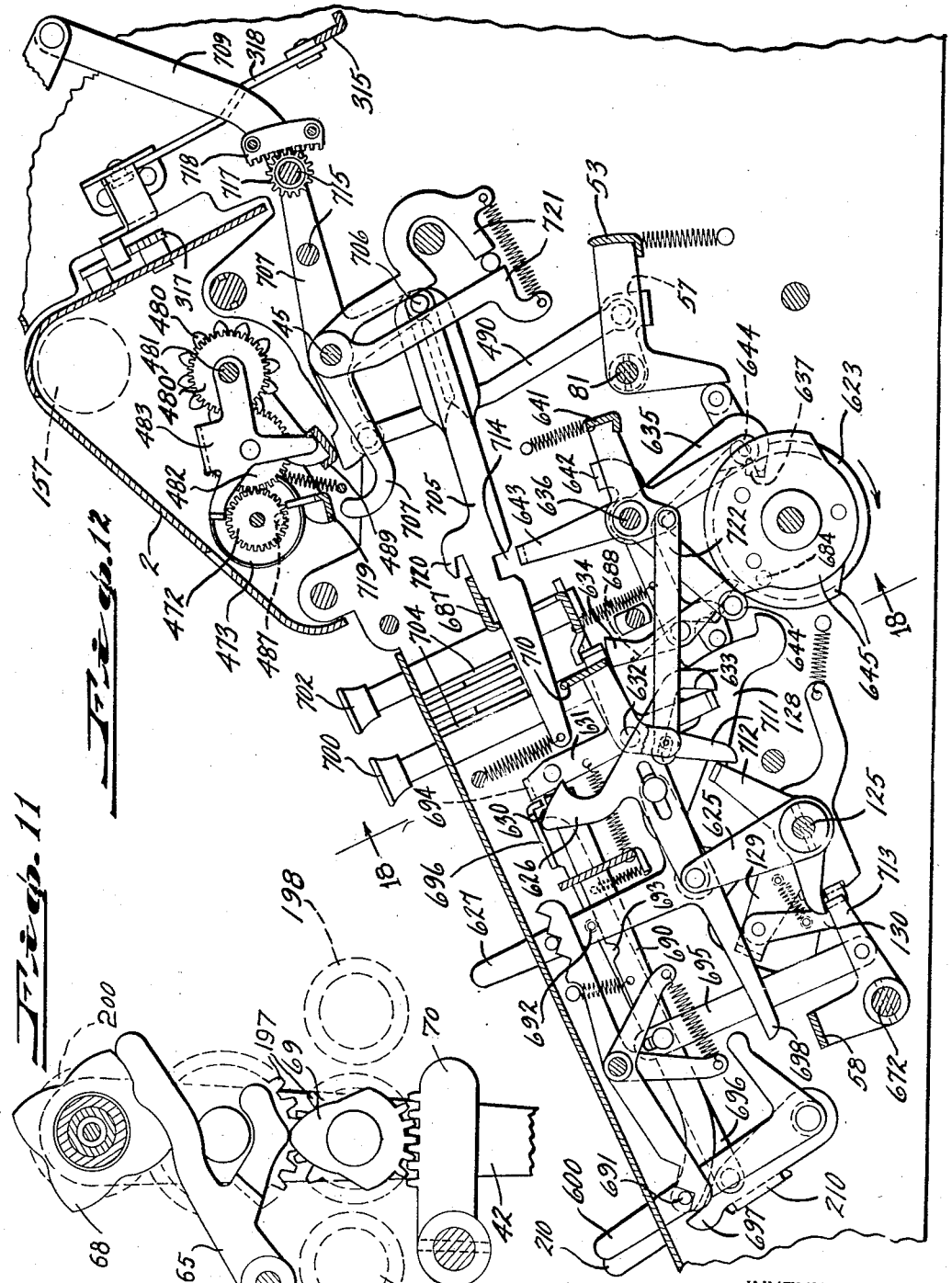
INVENTOR
George C. Chase
BY Stuart Hilde ATTORNEY
Witness
Elmer W. Edwards Nov. 20, 1945. G. C. CHASE 2,389,182
LISTING CALCULATOR
Filed Nov. 19, 1940 14 Sheets-Sheet 8
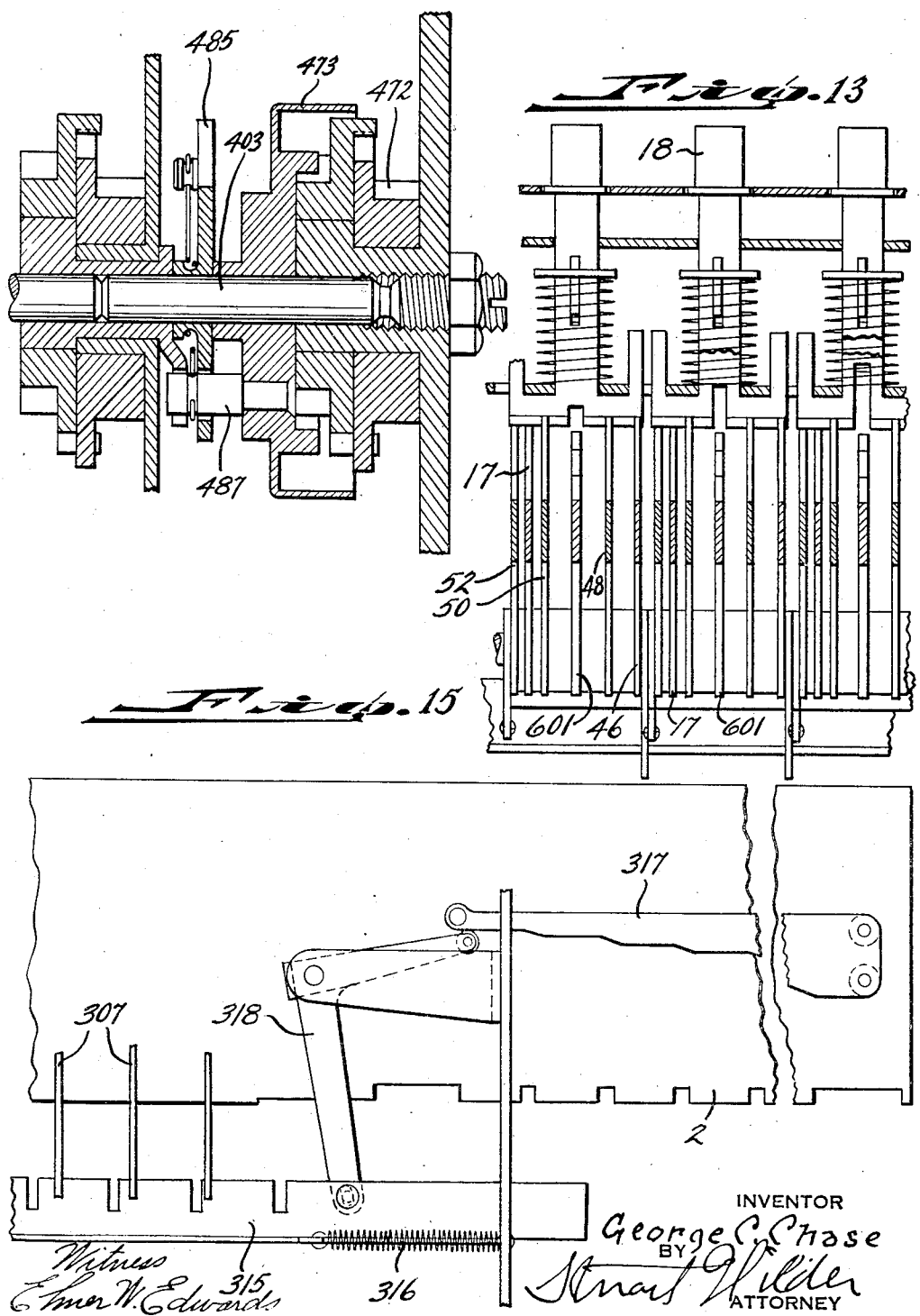

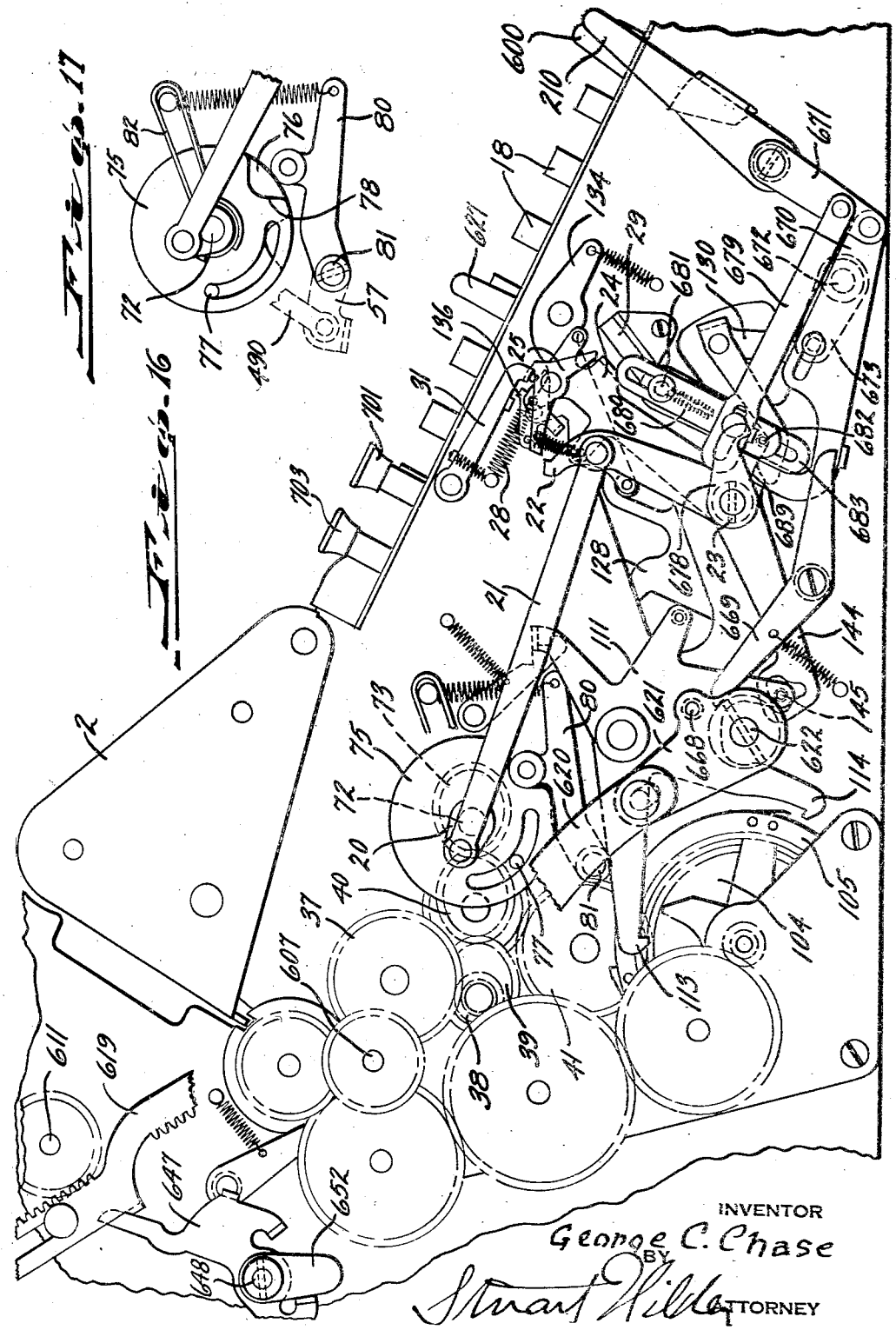

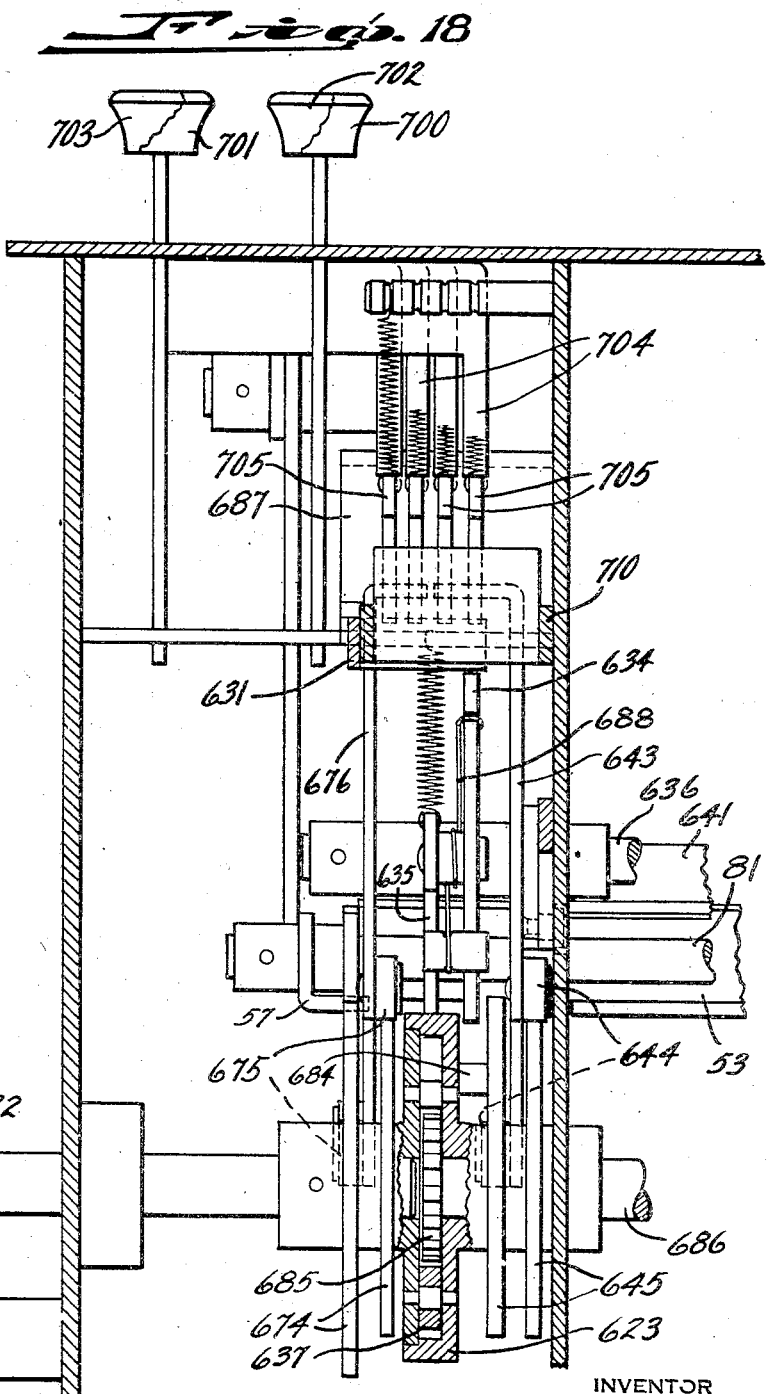

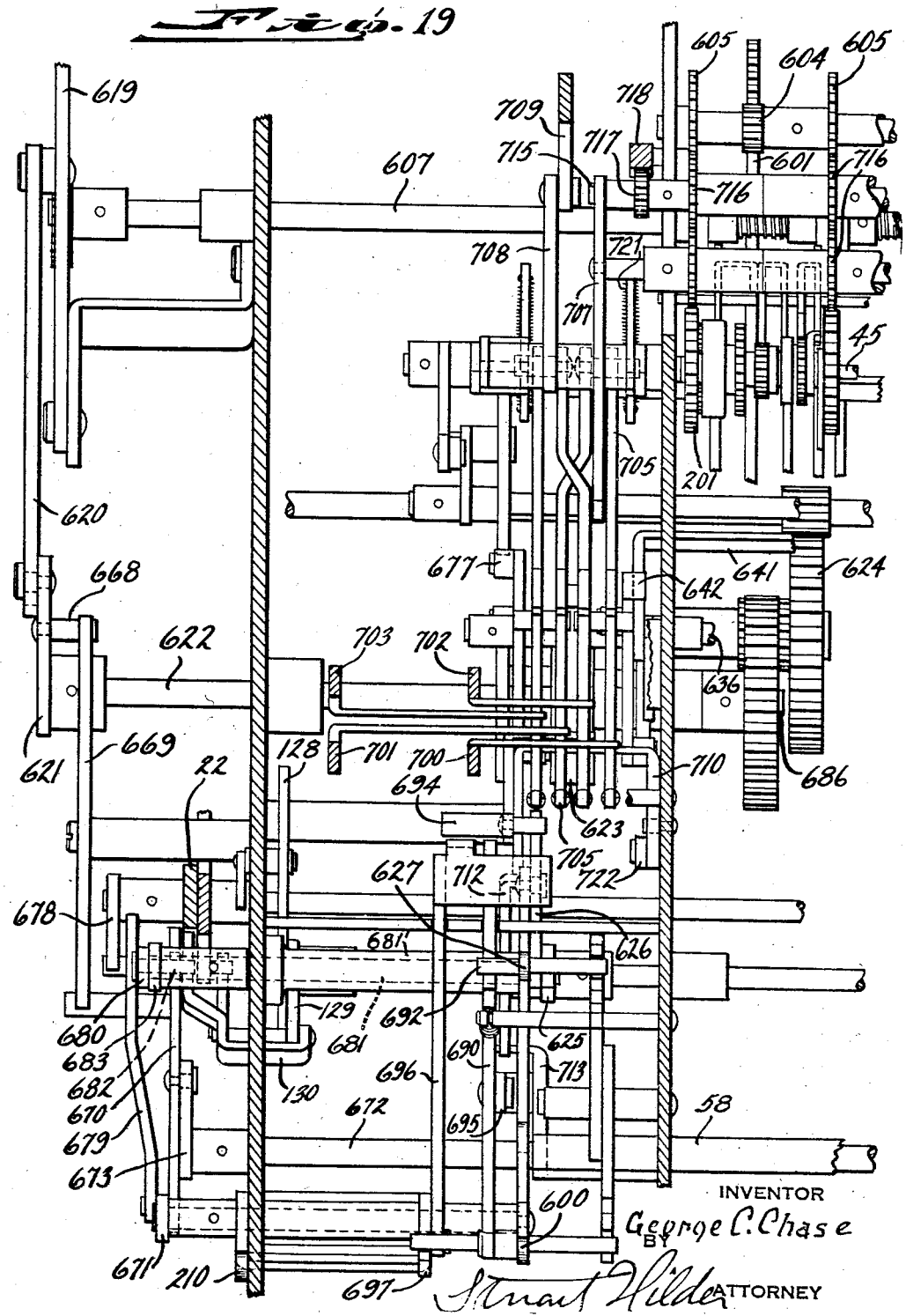

Nov. 20, 1945.　　　　　G. C. CHASE　　　　　2,389,182
LISTING CALCULATOR
Filed Nov. 19, 1940　　　14 Sheets-Sheet 12
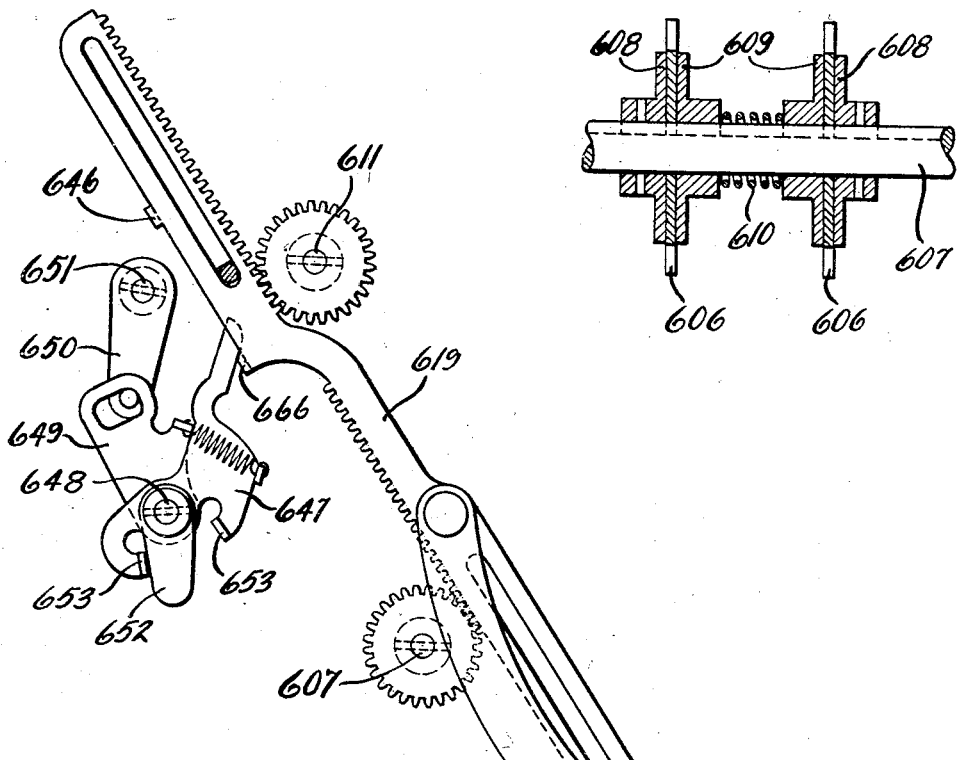
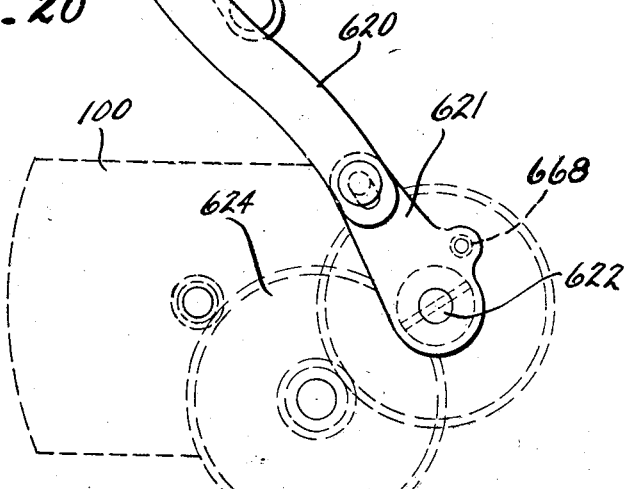
INVENTOR
George C. Chase
BY
Stuart Wilde
ATTORNEY Nov. 20, 1945.  G. C. CHASE  2,389,182
LISTING CALCULATOR
Filed Nov. 19, 1940  14 Sheets-Sheet 13

Witness
Elmer W. Edwards

INVENTOR
George C. Chase
BY
S. Stuart Wilde ATTORNEY

Nov. 20, 1945.  G. C. CHASE  2,389,182
LISTING CALCULATOR
Filed Nov. 19, 1940  14 Sheets-Sheet 14
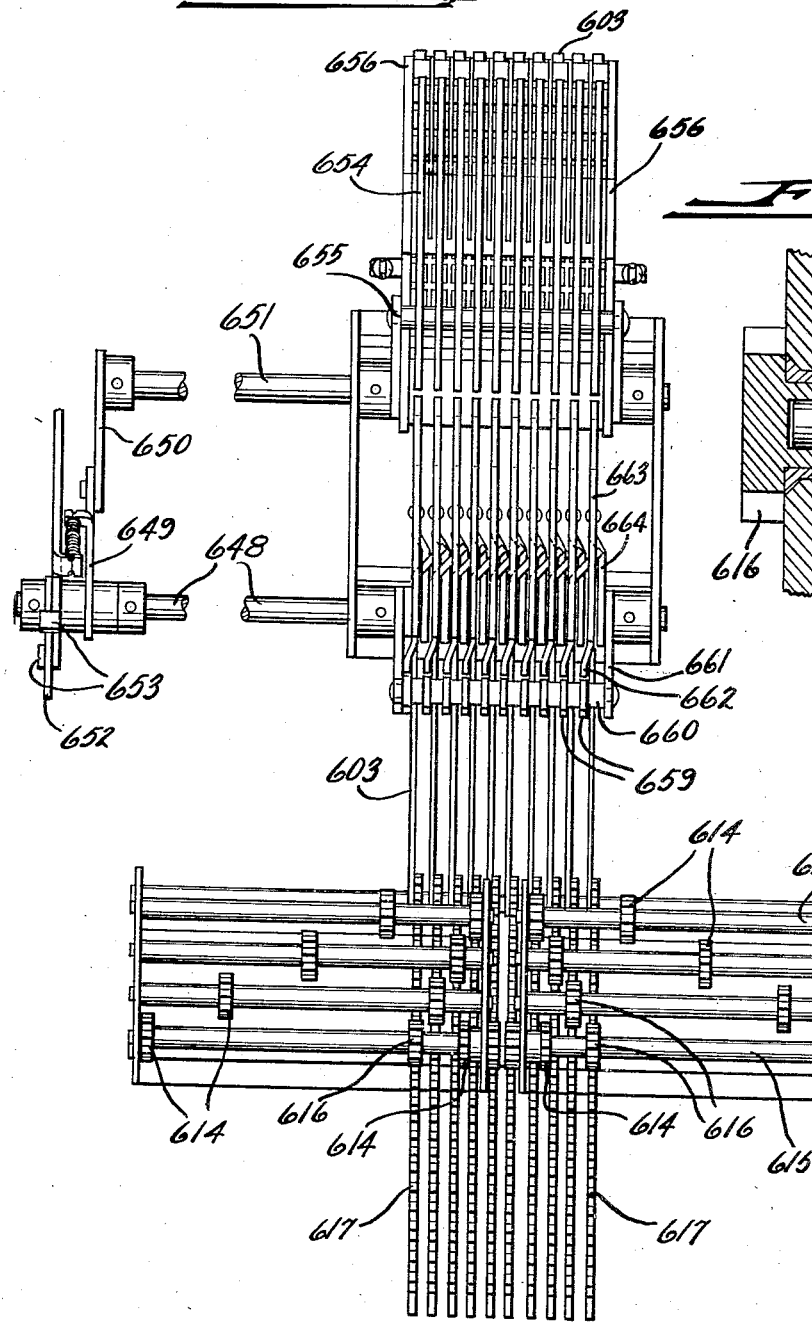
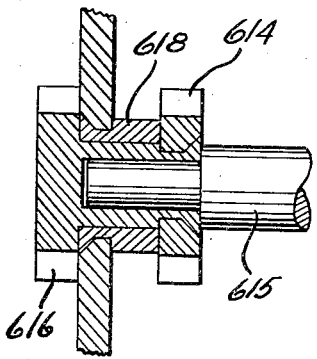
Fig. 23
Fig. 24
Witness
Elmer W. Edwards
INVENTOR
George C. Chase
BY
Stuart Wilder
ATTORNEY Patented Nov. 20, 1945

2,389,182

UNITED STATES PATENT OFFICE 2,389,182

LISTING CALCULATOR

George C. Chase, South Orange, N. J., assignor to Monroe Calculating Machine Company, Orange, N. J., a corporation of Delaware Application November 19, 1940, Serial No. 366,261

20 Claims. (Cl. 235—60)

The invention relates to listing calculators, and it provides means whereby single cycle listing mechanism may be operated at normal listing speeds concurrently with the operation of high speed multi-cycle four rules calculating mechanism.

The invention consists in the novel construction and combination of parts, as set forth in the appended claims.

In the accompanying drawings illustrating the invention,

Fig. 3 is a section taken through the keyboard and register carriage, portions of the machine being broken away.

Figs. 4 to 9 are detail right side elevations of the slides associated with a column of digit keys.

Fig. 10 is an enlarged detail axial section taken through a differential actuator unit, the lateral dimensions drawn to larger scale.

Fig. 11 is an enlarged detail left side elevation of means for locking one input leg of a differential actuator unit.

Fig. 12 is a fragmentary right hand elevation taken just inside the left side frame structure of the machine.

Fig. 13 is a section looking rearwardly through the keyboard between the 6 and 7 keys, with the keys broken away in two of the columns, to show the lower ends of the 8 and 9 keys.

Fig. 14 is an enlarged fragmentary detail axial section of a register showing a numeral wheel of the units order and a portion of the mechanism of the next higher wheel.

Fig. 15 is a rear elevation of the counting finger vernier control slide, shown in the position it takes when the totalizer carriage is at the extreme left.

Fig. 16 is a fragmentary left side elevation of the machine, with the casing removed.

Fig. 17 is a detail view of parts shown in Fig. 16, in a position assumed during the operation of the machine.

Fig. 18 is an enlarged cross section taken on line 18—18 of Fig. 12.

Fig. 19 is a plan view of portions of the mechanisms shown in Figs. 12, 18 and 20, the transverse dimensions being drawn to enlarged scale.

Fig. 20 is a detail left side elevation of the lister drive.

Fig. 21 is a detail cross section of the frictional driving elements for the lister.

Figure 22:
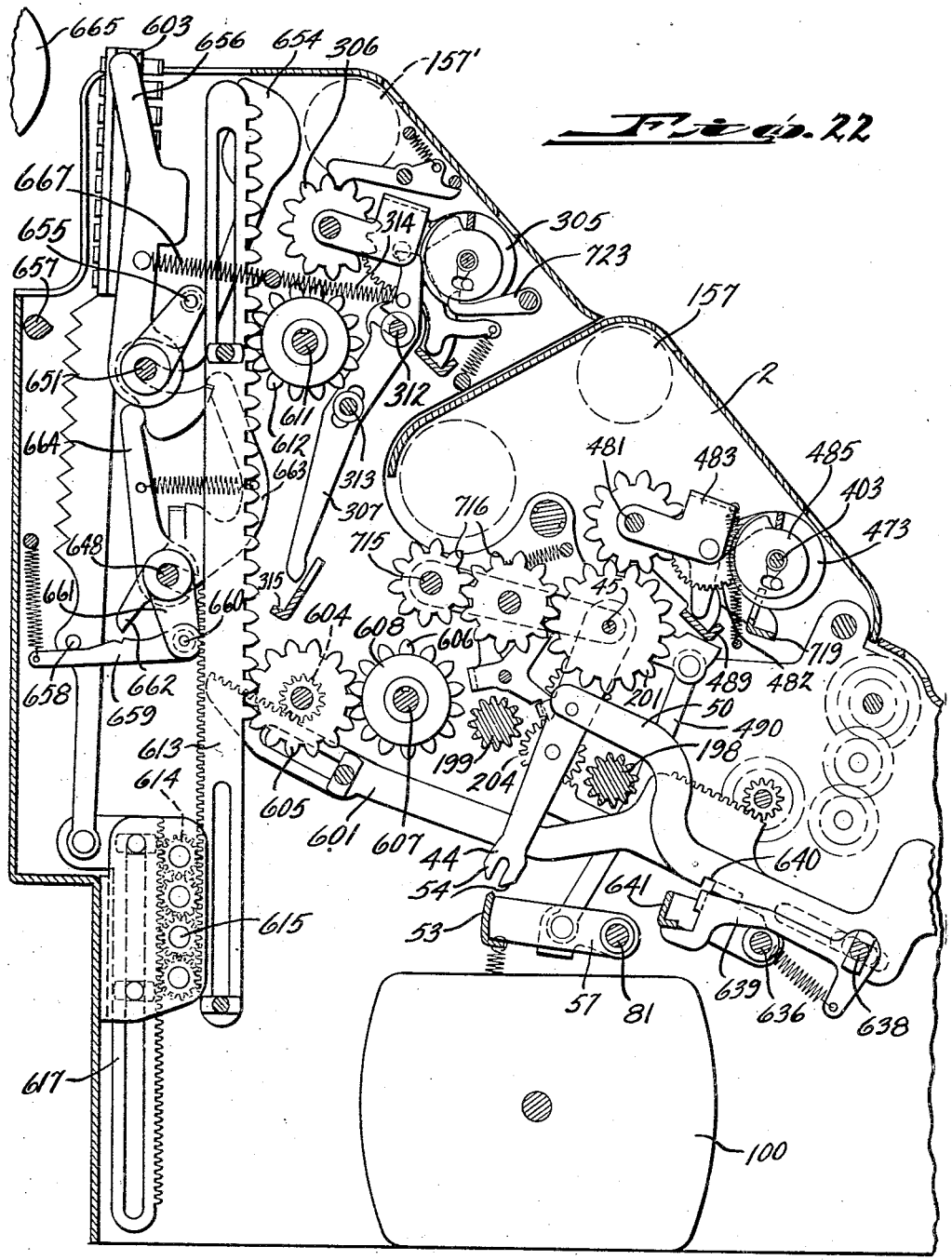

Fig. 22 is a left side cross sectional elevation of the rearward portion of the machine.

Fig. 23 is a rear view of the type members, showing the column space converging means.

Fig. 24 is a detail sectional view of parts shown in Fig. 23.

The calculator

The value entering mechanism shown herein is substantially the same as disclosed in a copending United States application issued to the present applicant as Patent No. 2,233,912, on March 4, 1941.

Digital values are registered on the numeral wheels of the machine preferably according to the semi-complemental system, wherein the lower value digits (as 1, 2, 3, 4) are registered normally, while the higher value digits (as 5, 6, 7, 8, 9) are registered by actuating the numeral wheels in accordance with the complements of the selected values.

Figure 1:
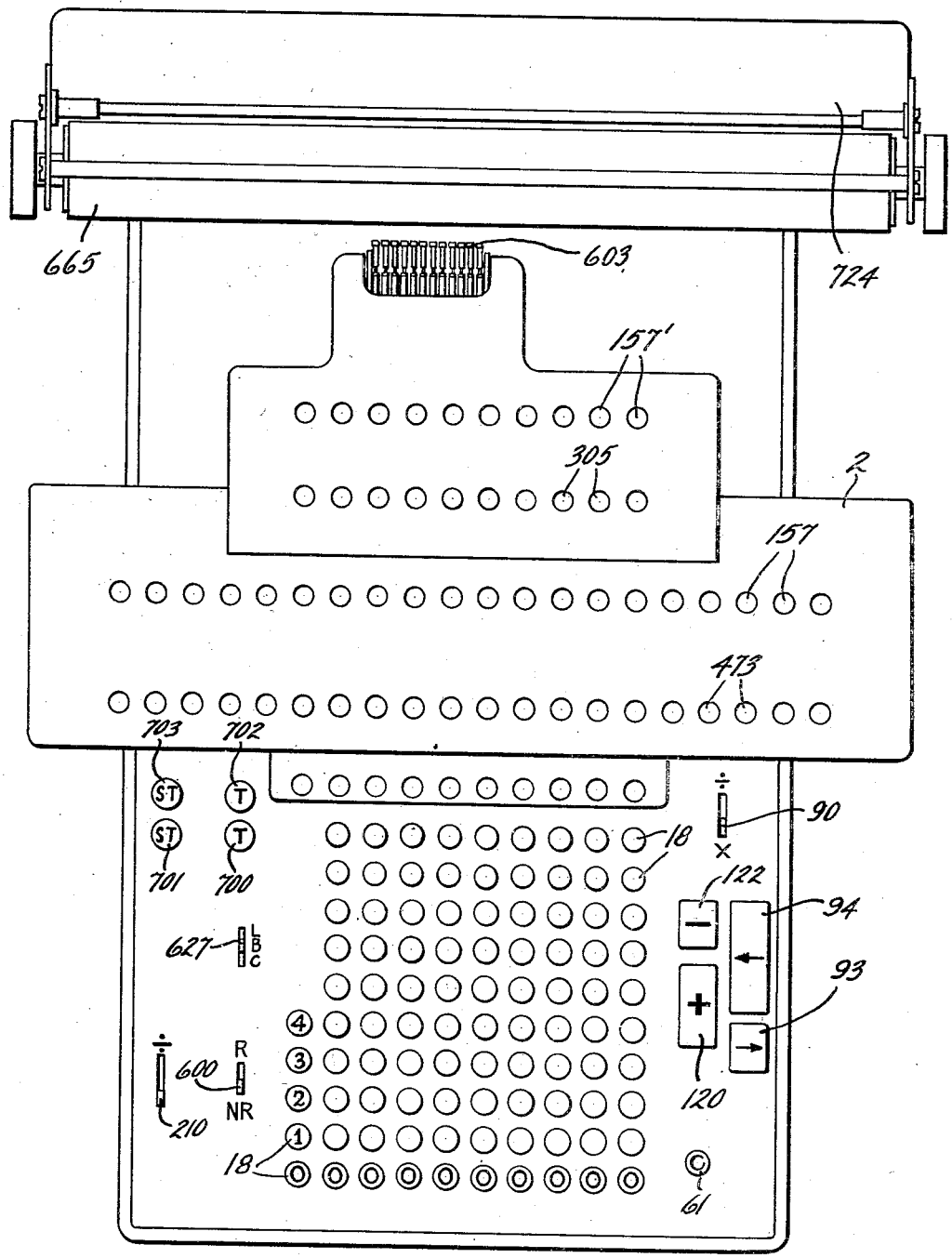
Fig. 1 is a plan view of a calculating machine embodying the invention.

The differential actuator mechanism provides means whereby amounts set up in the digital keys 18 (Fig. 1) may be registered on the numeral wheels 473 of a product-dividend register. This mechanism is designed to provide a constantly interlocked continuous drive, the numeral wheels being preferably provided with tens transfer mechanism of the "crawl" type and standing normally aligned, as illustrated in United States Patent No. 2,089,682, issued to the present applicant on August 10, 1937.

Related to each column of digit keys 18 (Fig. 1) is an orbital gear actuator unit (Figs. 3 and 10) shown as a simple planetary train of two input legs and one output leg. Each input leg of the differential is designed to transmit single digit values to the numeral wheels or to combine part digit values in the differential to register the sum of or the difference between these values. The output gear 201 of the differential drives the numeral wheels 473 through the gear train 480, 480', 482 and 472 (Figs. 3 and 12). The input legs of the differential, of differing gear ratios, are adapted through pendant gear trains 197, 203, 204 (Fig. 10) to be meshed with either of two oppositely rotated pinion wire gears 198, 199. Any pendant train may be meshed singly or in combination with other trains, the input values being merged and their sums or differences transmitted through the orbital gearing to the output gear 201.

The pendant trains 197, 203 and 204 are mounted upon plates 42, 43 and 44 respectively as seen in Figs. 3, 10 and 22, these plates being mounted for pivotal movement about the shaft 45 which supports the differential actuator units. Plates 42, 43 and 44 are rocked to bring the respective gear trains into mesh with the pinion wire gears 198, 199 by means of slides controlled by the digit keys 18.

There are four of said slides provided for each bank of digit keys (Figs. 3, 4, 5, 6, 8, 10, 13 and 22); a slide 46 having a rack and pinion connection 47 with plate 42 and movable toward the front of the machine to engage pendant train 197 with pinion wire gear 198, to effect a registration of −1; a slide 48, having pivotal connection with plate 43 and movable forwardly or rearwardly to engage train 203 with gear 198 or 199 to register ±4; a slide 50 having pivotal connection with plate 44 and movable forwardly or rearwardly to engage train 204 with gear 198 or 199 to register ±2, and a slide 52, having rack connection with the pinion 47 of the next higher order, and movable toward the rear of the machine to rock plate 42 and engage train 197 with pinion wire gear 199, to register +10, said slide being adapted, through pinion 47, to act in conjunction with the −1 slide 46 so that a setting of −1 and a +1 set in connection with a complemental value in the lower order may cancel one another.

The initial forward or rearward setting of these slides is effected by the keys 18, the setting being completed, upon operation of the machine, by the action of a universal bail 53 (Fig. 3), engaging cam faces 54 of the plates 42, 43 and 44. Bail 53 is pivotally mounted upon a transverse shaft 81 and operated through engagement with an arm 57 fast to shaft 81 as will be hereinafter described.

The lower ends of the digit keys 18 are beveled and are designed to engage cam projections 55 of the slides, to effect the preliminary setting movement thereof. The arrangements of these cam projections to give the correct setting for the different digits is illustrated in Figs. 4, 5, 6 and 8.

The keys are latched in depressed position by means of a slide 17 (Figs. 9 and 13), the depression of any key effecting the release of any previously depressed key of the same order when it has travelled approximately one-third of its stroke. The keys may be released in all columns by means of a bail 58 (Figs. 3 and 12) engaging lugs 59 of the latching slides, bail 58 being operable in known manner by a clearout key 61 (Fig. 1) and by automatic means to be described. The slides 46, 52 and 17, each of which is shifted in but one direction by key depression, are held in their normal positions by means of springs 62, while the slides 48 and 50, each of which may be shifted forwardly or rearwardly by the keys, are normally centralized by means of the opposed spring urged jaws 63 illustrated in Fig. 3.

When the machine is at rest the differential actuator units and their pendant trains are locked against rotary movement by means of spring pawls 64 and positive locking pawls 65 (Figs. 3 and 11), the pawl 64 engaging the teeth of the differential gears 206 (Fig. 10) and thus locking the ring gear and its associated parts. Rocking of plate 43 or plate 44 in either direction by bail 53 (but not by the depression of keys 18) will lift pawl 64 out of engagement and the ring gear will be free to rotate.

Pawl 65 is normally in engagement with a locking cam 68, fast to the differential gear 200 related to the pendant train 197 of the second leg of the differential. Pawl 65, through engagement with a cam 69 pivotally mounted upon pendant arm 42, serves as a positive lock for the sun gear and its associated parts.

During the setting of pendant arm 42 cam 69, through engagement with the teeth of a fixed rack 70, will be rocked free of pawl 65 permitting operation of gear 200 and its associated parts.

Multiplication may be performed by repeated addition, and division by repeated subtraction; that is to say, by repeated registering cycles of the machine. The pinion wire gears 198, 199 are therefore driven cyclically, being started and stopped in full cycle position, relative to the registering action.

Figure 2:
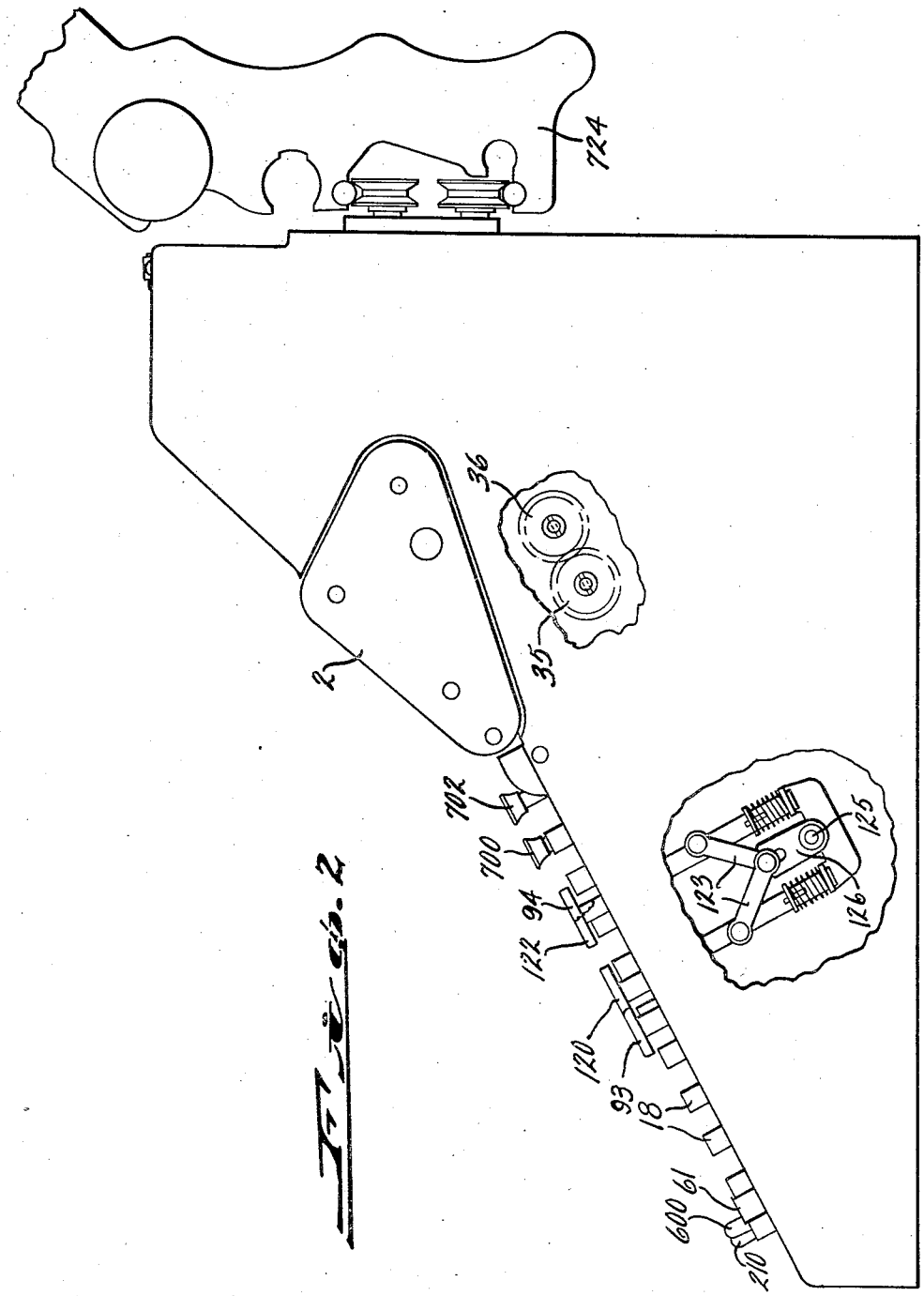
Fig. 2 is a right side elevation, with parts of the casing and carriage shift key mechanism broken away.

The pinion wire gears 198, 199 are connected by gears 35, 36 mounted upon their spindles (Fig. 2) and pinion wire gear 199 is provided with a drive gear 37 (Fig. 16), mounted upon its opposite or left hand end. Gear 37 is driven through pinion 38, elliptic gears 39, 40 and a train of spur gears 41, preferably from electric motor 100 (Fig. 22). A differential gear clutching and reversing mechanism is interposed between motor 100 and gear train 41, this mechanism being designated by the numeral 105, and being more particularly illustrated in Patent No. 1,566,650 issued to the present applicant on December 22, 1925. The clutch is effected by clutch lever 111, movable in either direction from neutral position to engage either of its opposite jaws 113, 114 with stop lugs fast upon different members of the differential gear train, engagment of jaw 113 resulting in subtractive rotation of the output gear 104, and engagement of jaw 114 effecting additive rotation of said gear. Output gear 104 meshes with one of the gears of the train 41, and thereby transmits additive or subtractive movement to the pinion wire gears 198, 199. Clutch lever 111 is controlled through a setting lever 128 (Figs. 3 and 16), loosely mounted on a rock shaft 125 which extends to the right hand side of the machine. Fast to the left hand end of said shaft is an arm 129 coupled to setting lever 128 by means of spring urged latch 130, so that as shaft 125 is rocked setting lever 128 will move therewith. An arm 126 (Fig. 2) is mounted on the right hand end of shaft 125, and is connected by links 123 with the stems of two keys or bars 120, 122 controlling plus and minus operation of the clutch, respectively.

The numeral wheel mechanism of the product-dividend register 473 and of the multiplier-quotient register 305 is similar in principle to that shown in present applicant's Patent No. 2,089,682. In structural details, it follows more specifically the construction set forth in a co-pending application issued to the present applicant as Patent No. 2,278,863, on April 7, 1942, and which relates to means for simultaneously restoring to zero all of the numeral wheels comprising the register 473, and to means whereby grand totals may be accumulated and indicated in a second register which is also provided within the carriage. The position of this grand total indicating wheel is shown in Figs. 1, 3, 12 and 22 of the present application by the numeral 157, but this mechanism is not shown in detail or described since it forms no essential part of the present invention.

A similar grand total indicator is shown by the numeral 157' for the purpose of indicating the grand total of a series of registrations of the multiplier-quotient wheels 305.

A grand total appearing in the register 157 or 157' may be printed by transferring it to the related register 473 or 305 after the latter has been cleared to zero as explained in said copending application Serial No. 321,732, and by then taking a total or sub-total from the latter register.

It is to be noted that, since the register 473 is mounted in a shiftable carriage 2, the totalizer and sub-totalizer mechanisms cannot act upon all of the numeral wheels of that register, but only those which are related to the selector gearing within the main framework of the machine. It is assumed that the carriage shall be positioned to properly locate the decimal point before taking a total or sub-total from that register.

It is, of course, also intended that means for clearing the registers 473 to zero, as shown in Patent No. 2,278,863, above referred to, or some other suitable zero setting mechanism shall be used in conjunction with the mechanism shown in this application, in order to provide for simultaneous clearing of all of the wheels of said register, but this mechanism has not been indicated in the present application as it forms no part of this invention.

To adjust the drive of the register wheels 473 from aligned into crawl tens transfer position, as set forth in Patent No. 2,089,682, hereinbefore referred to, arm 57 (Figs. 3 and 22) is provided with a linkage 490, operable to lift a bail 489, which is mounted in the register carriage 2 of the machine, bail 489 engaging a series of aligner levers 483 fulcrumed at 484 and having each mounted thereon an aligner gear 482 related to a numeral wheel 473. Each lever 483 is provided with a lug acting as a follower or feeler of the aligner cam 465 loosely mounted upon the numeral wheel shaft 403 (Figs. 14 and 22) and adapted to be rotated with the numeral wheel of next adjacent lower order. The lifting of bail 489 by arm 57 lifts all of the aligner levers 483 high enough for the high point of the aligner cams 485 to rotate without moving them. During the operation of the machine, partial or fractional tens transfer movement will be transmitted from wheel to wheel, in well known manner, and at the end of the operation, the dropping of bail 489 will allow the levers 483 to drop into contact with the cams 485, under the influence of suitable springs attached to the levers, this movement effecting planetary movement of the aligner gears 482 and thereby transmitting movement to the numeral wheel sufficient to compensate for the partial tens transfer displacement of the wheel.

It is desirable that the parts adjusted as above described by movement of the arm 57 should be held in adjusted position until the machine is brought to rest, so that when multiple cycles of operation are performed, unnecessary adjustment of the parts may be avoided. This is accomplished as follows:

A shaft 72 (Figs. 16 and 17) is driven one complete rotation during each operative cycle of the machine by means of elliptic gear 73 meshing with the elliptic gear 40, shaft 72 being provided with a crank arm 20 and link 21 whereby said shaft is connected to stopping mechanism corresponding to that shown in Patent No. 1,566,650 hereinbefore referred to. As set forth in said patent, link 21 is connected at its forward end to a rock lever 22, fulcrumed at 23 in the framing, said lever being thus constantly reciprocated during the operation of the machine. During the final cycle of the operation, a trigger 31 is tripped, either by mechanism operated upon the release of the ±bar 120, 122 or by movement of one of the numeral wheels 473, in well known manner.

Tripping of trigger 31 will release a normally restrained spring pawl 25, pivotally mounted upon a stop arm 24, said arm being pivoted to the framing at point 23. Pawl 25 being released will drop into the path of movement of a lug of rock lever 22, thereby coupling arm 24 to said rock lever. Continued clockwise movement of lever 22 beyond the full cycle position of the parts shown in Fig. 16 will rock the arm 24 forwardly against the tension of a spring 28, until a lug of said arm encounters a fixed stop 29 whereby continued rotation of the machine in the original direction will be arrested. At the same time an extension 144 of arm 24 will rise, bringing one of two opposed cam portions of said extension into contact with a centralizing pin 145 secured upon the clutch lever 111, thereby releasing the clutch. The parts, having now overrun full cycle position, will be brought back by action of spring 28.

The arm 57 is controlled from shaft 72 by means of two disks 75, 76 (Fig. 17) having a pin and slot connection 77 with each other and being each provided with a cam notch 78, these two notches registering normally with each other and being engaged by a roller fixed upon a spring follower arm 80. Arm 80 is secured to the shaft 81 upon which arm 57 is rigidly mounted. Disk 76 is fast upon shaft 72, while disk 75 is loosely mounted thereon and is provided with a friction spring 82. Upon rotation of the parts in either direction, friction spring 82 will cause disk 75 to lag relatively to disk 76, and the two notches 78 will lie out of line with each other, so that the roller of arm 80 will in effect be held in operated position by the periphery of an unbroken disk, as seen in Fig. 17 of the drawings. This will hold arm 57 and the parts operated thereby in adjusted position so long as the machine continues to operate. When the operation is concluded, and the parts are brought back from overrun to full cycle position, disk 75 will again lag until the two notches 78 are brought into register with each other, which will occur as the parts come to full cycle position, whereupon the roller will enter the notches and arm 57 and the associated parts will be retracted.

A manually settable repeat and non-repeat lever 600 (Figs. 1, 12 and 16) may be adjusted to set means for single or multiple cycles of operation as will be hereinafter described.

The listing mechanism

A listing mechanism is built into the calculating machine and provided with a drive independent of the register actuating and decade shifting drives, controls being provided whereby the calculating and the listing mechanism may be operated concomitantly or independently, either to print factors of the problem being computed, to calculate without printing or to print values standing anywhere in the machine.

Related to each column of digit keys 18 is a listing slide 601 (Figs. 3, 7, 13 and 22) provided with eight projections 602, individually engageable with depressed digit keys 1 to 8 to limit the forward movement of said slide to bring a related type bar 603 into proper printing position. As shown in Fig. 13, notches of varying depth are cut in the lower ends of the 7, 8 and 9 keys, through which the projection 602, which encounters the next lower key, may pass, these three projections being stepped in height (Fig. 7) to engage the key 6, 7 or 8 respectively, whichever is depressed. No lug is provided to engage the 9 key, the slide advancing to its limit of movement if that key is depressed.

The rearward end of slide 601 is provided with rack teeth having engagement with related pinions 604, said pinions being fast to gears 605 loosely mounted upon a transverse supporting shaft. Gears 605 are in mesh with related gears 606 loosely mounted upon a transverse shaft 607, but adapted to be rotated therewith through the friction drive means illustrated in Fig. 21, gears 606 being spaced between friction disks 608, 609 splined to shaft 607 to rotate therewith. Friction disks 609 are forced by means of a suitable compression spring 610 against the face of gears 606, disk 608 being held against lateral movement by means of pins extending through the shaft.

Mounted upon a transverse shaft 611 (Figs. 20 and 22) is a corresponding series of gears 612 frictionally driven in the manner described for the gears 606.

Vertical slides 613, guided upon transverse rods, have each engagement with the gears 605, 612 in corresponding columns. Since the slides 613 are spaced apart according to the key column spacing and the type bars 603 according to the usual printing spacing, the following converging means is provided. The rearward edges of slides 613 are provided with rack teeth engaging gears 614 (Figs. 22 and 23) fast upon transversely extending shafts 615 rotatably mounted in frame brackets. Also fast to the shafts 615 are gears 616 having engagement with teeth of rack slides 617 upon which the type bars 603 are pivotally mounted.

In order to provide for compactness of structure, the shafts 615 are divided into two axially aligned groups, as illustrated in Fig. 23, and each of the lowest shafts is supported in the recessed hub of a pair of gears 614, 616 supported in a bushing 618 fast to the inner end plates of the brackets, as shown in Fig. 24.

Shafts 607 and 611 are rotated forwardly and reversely by means of a slide rack 619 (Figs. 16, 19 and 20) having engagement with gears fast to the left hand ends of said shafts. Rack 619 has a link connection 620, (also Fig. 18) with a crank arm 621, fast to a shaft 622 which is driven by a one-cycle clutch 623 (Figs. 12 and 18) having drive connections to electric motor 100 through reduction gear train 624 (Fig. 20). Upon depression of the plus key 120 or the minus key 122 clutch 623 will be operated in the following manner:

As previously described, the operation of either of these keys will rock a transverse shaft 125, the depression of key 120 rocking said shaft in a clockwise direction and the key 122 rocking said shaft in a counter-clockwise direction, as viewed in Fig. 12.

Pivotally mounted upon an arm 625 fast on the left hand end of rock shaft 125 is a push-pull lever 626 adapted to be pulled forwardly upon counter-clockwise movement of shaft 125 and pushed rearwardly upon clockwise movement of said shaft. Push-pull lever 626 has pin and slot connection with a rearwardly extending arm of a setting lever 627 to be hereinafter described. With the setting lever in its central position, the pin and slot connection will guide push-pull lever 626 in its rearward movement to thrust surface 630 of said lever against a pin fast in the upper arm of a three-armed lever 631, fulcrumed upon the framing at 632 to thereby impart a clockwise movement to said lever. In the forward movement of push-pull lever 626 a surface 633 of said lever will engage with a projection on a lower arm of three-armed lever 631, to also impart clockwise movement thereto. The third arm of this lever projects rearwardly, and is provided with a lug overlying a coupling member 634 pivotally mounted upon a forwardly extending arm of the clutch detent 635 which is pivotally supported upon a transverse rod 636. The rocking movement of shaft 125 upon depression of the plus or minus keys 120, 122 will therefore withdraw the clutch detent 635 from the pawl 637 of the one-cycle clutch 623 to engage the drive and impart counter-clockwise rotation (as viewed in Fig. 20) to the shaft 622 and crank arm 621, imparting reciprocatory movement to the rack slide 619 as previously described.

During the forward stroke of the machine rack 619 will rotate the shaft 607 in a clockwise direction and the shaft 611 in a counter-clockwise direction, whereupon any of the slides 601, 613 and 617 which are free to move will be operated by the related frictionally driven gears 606 and 612 until stopped by engagement of a projection 602 with a related depressed digit key, thereby bringing the type bars 603 into corresponding value printing position.

*Column latches*

The following means will prevent movement of the slides and related type bars in any column wherein no key is depressed. Pivotally supported upon transverse rod 638 (Figs. 3 and 22) are a series of column latches 639. Each column latch 639 is formed as a U blank, the cross-over of which extends beneath notch 640 of the related listing slide 601 and the related setting slides 46, 48, 50, 52 (Figs. 4 to 8) for the differential actuator unit. All of the column latches 639 are normally held out of engagement with the notches 640 by means of a universal bar 641 fast upon transverse rod 636. This bar is normally held in lowered position by means of the projection 642 (Fig. 12) of a rocker device 643 upon the lower arms of which are mounted rollers 644 embracing positive motion cams 645, fast to the driven member of the one cycle clutch 623 previously described.

During the first part of the movement of clutch 623 cams 645 will operate the rocker device 643 in a counter-clockwise direction, whereupon universal bar 641 will move upwardly under influence of a suitable spring, releasing the column latches 639 and allowing said latches to enter the notches 640 of the related slides in any order in which a key has not been depressed. In any order wherein a setting slide has been displaced by a depressed digit key, the notch 640 of one of said slides will be displaced, whereupon the column latch 639 will engage the lower surface of said displaced slide, which will hold out the column latch in that particular order.

Thus in any order wherein no key has been depressed, the column latches 639 of that order will prevent movement of the related slides 601, 613 and 617 to hold the type bar 603 in zero printing position.

The short cut tens slide 52 takes no part in the control of the column latches 639, since said slide is controlled from a lower order column and is never operated except in conjunction with one or more of the setting slides of the lower order. Therefore, the notch 640 of that slide is made wider, for clearance, as shown in Fig. 4. A lost motion slot is provided in the crank arm 621 (Fig. 20) to allow for operation of the column latches prior to any movement of the listing slides 601.

Rack slide 619 is driven far enough by crank arm 621 to impart sufficient rotation to the shafts 607, 611 to give the gears 606 and 612 a ten tooth movement, and since the rack slides have a maximum movement of but nine steps, full movement will be assured the listing mechanism, allowing for any slippage or loss through the frictionally driven parts.

*Printing means*

As rack 619 (Fig. 20) is moved downwardly during the forward stroke of the machine, a projection 646 of said rack will engage an arm 647 pivotally mounted upon the left hand end of a transversely extending shaft 648, imparting clockwise movement to said arm.

Arm 647 has yieldable spring connection with a lever 649 also loosely mounted upon the shaft 648 and having pin and slot connection with an arm 650 secured to the left hand end of hammer restoring shaft 651. During the above described movement of arm 647 lever 649 will be rocked, rotating arm 650 and shaft 651 in a counter-clockwise direction, as viewed in Figs. 20 and 22. Secured to shaft 648 is an arm 652 extending downwardly between a pair of projections 653 of the arm 647 and during the operation of said arm above described a projection 653 will engage arm 652, imparting a clockwise movement to the shaft 648 to trip the type hammers 654 in the following manner:

The hammers 654 are normally held in their forward position by means of a restoring bail 655 extending across the hammers and suitably secured to the shaft 651. During the counter-clockwise movement of shaft 651 above described, restoring bail 655 will be carried rearwardly, into engagement with frames 656 pivotally mounted upon the shaft 651 and serving as guides for the upper ends of the type bars 603, so that the type bars will be rocked into engagement with an aligning bar 657, this movement being designed to take place near the end of the forward stroke of the cycle; that is, after the type bars 603 have completed their upward movement. At the start of the upward movement pins 658 fixed in the type bars freed latches 659 pivotally mounted upon a rod 660 supported in arms 661 fast to the shaft 648, whereupon said latches under the influence of their respective springs moved upwardly into engagement with a projection 662 of related triggers 663 loosely mounted upon the shaft 648. When type bars 603 have moved into engagement with the aligner bar 657 projection 653 rocks the shaft 648 in a clockwise direction as previously described, carrying latches 659 rearwardly, so that wherever a latch 659 has been brought into engagement with a trigger 663 the trigger will be tripped, releasing the related type hammer 654 for operation by a spring urged finger 664 to drive the type against the printing platen 665.

The usual overlapping portions of the triggers 663 provide for the printing of zeros in all columns to the right of a significant digit. A value having been printed, crank arm 621 will act to restore the parts during the return stroke in the following manner:

The lost motion slot will first provide time for the positive motion cam 645 (Fig. 12) to restore the rocker device 643 to normal position, whereupon universal bar 641 will restore the column latches 639 to their normal position, out of engagement with the selector slides 46, 48, 50 and listing slides 601. The listing slides are then restored to normal through the return movement of the rack 619.

As rack 619 completes its upward movement a projection 666 of said rack will engage arm 647 to restore the type hammers and associated parts to their normal position, a spring 667 serving to withdraw the type bars 603 out of engagement with aligning bar 657 as bail 655 is restored, prior to the return movement of the type bars. During the last part of the return cycle of crank arm 621 a pin 668 (Fig. 16) fast in said arm will impart clockwise movement to a bell crank lever 669, fulcrumed upon the framing of the machine. The rearward end of bell crank 669 overlies a lug of an arm 670, pivotally mounted upon an arm 671, forming part of the repeat, non-repeat lever 600 (Figs. 12, 16 and 19), said lever being shown in its forward or non-repeat position. Clear out bail 58 (Fig. 12) is fast to a transverse rod 672 having fast to the left hand end thereof an arm 673 (Fig. 16) having pin and slot connection with the arm 670. Upon clockwise movement of bell crank 669, said bell crank will depress arm 670, rocking arm 673 clockwise, as viewed in Fig. 3, whereupon universal bail 58 will release the keys 18 as previously described.

It has been seen that universal bail 53 (Fig. 3) serves to lock plates 42, 43 and 44 of the actuators, and this will in turn prevent sufficient depression of any raised keys 18 (in the columns wherein the latches 639 have not been engaged) to interfere with the proper action of the listing slides 601. Since the rapid calculating cycles may be completed while a listing cycle is still running, bail 53 will be held in engagement with said plates until near the end of the listing cycle (that is, until the listing slides 601 have been restored to their normal position) by means of positive motion cams 674 fast to the hub of the one cycle clutch 623, said cams imparting reciprocatory movement, through rollers 675, to a rocker 676, loosely mounted upon the rod 636. Cams 674 are adapted to hold rocker 676 in operated position until near the end of the cycle, a roller 677 of said rocker engaging with an arm of bail 53 serving to hold said bail in operated position.

*Calculator one-cycle stopping mechanism*

During each calculating cycle rock lever 22 (Fig. 16) is reciprocated, as previously described. To the hub of said rock lever there is secured a forwardly extending arm 678 overlying (in the non-repeat position of key 600) a lug of a link 679, the forward end of which is pivotally supported upon the arm 671 of the repeat non-repeat key 600. The rearward end of link 679 has pin and slot connection with a slide 680 which is provided with a slot engaging the shaft 681 of the setting lever 627 which determines whether the machine shall calculate only, list only, or calculate and list. Fast to the lower end of slide 680 is a pin 682 engaging a slot of an arm 683, said arm being fixed upon shaft 681, upon which setting lever 627 is also fixed. Shaft 681 is supported in a sleeve 681', carried by the machine framing, as illustrated in Fig. 19.

During the forward movement of rocker 22 arm 678 will depress link 679 and the slide 680, whereupon pin 682 will engage an arm of coupling latch 130 and rock said latch out of engagement with the setting lever 128 (Figs. 3, 12 and 16), whereupon said lever and stopping lever 134, with its pawl 136, will be restored to normal position by their springs, tripping the trigger 31 of the calculator full cycle stopping mechanism in the manner described in Patent No. 1,566,650.

Lister, one-cycle stopping mechanism

The following means will prevent more than one cycle of operation of the listing mechanism in the event an operating key should be held in depressed position. As previously described, clutch 623 is engaged upon withdrawal of the clutch detent 635 through engagement of the lever 631 (Fig. 12) with trigger 634, pivotally mounted on said detent. During the withdrawal of the detent, the lower projecting end of the trigger 634 will be carried downwardly into the path of movement of a pin 684 mounted in one of the cams 645, driven by the clutch, as shown in Figs. 12 and 18. During the rotation of the clutch, pin 684 will engage trigger 634, rotating it counter-clockwise about its pivot, out of position beneath lever 631, whereupon detent 635 will be moved slightly clockwise by its spring, until stopped by the periphery of clutch 623. During the above movement of clutch detent 635 trigger 634 will have been carried slightly upward to a position forward of the contacting bent end of lever 631, and as clutch 623 completes one cycle of operation the clutch detent 635 will be free to reengage pawl 637, disengaging said pawl from the driving element 685 fast to the drive shaft 686 (Fig. 18).

Upon release of the operating key (120, 122) the three-armed lever 631 will be restored to normal position under the influence of its spring, where it will be held by engagement with a frame bracket 687. This movement of lever 631 will release trigger 634, whereupon said trigger, under influence of spring 688, will be restored to its normal position beneath the end of rearward arm of lever 631.

Non-list or calculate-only, one cycle operations

The following means provide for one cycle calculating non-list operations, lever 600 being set to nonrepeat position. As previously described, push-pull lever 626 is guided at its rearward end by pin and slot connection with setting lever 627 which has three positions of adjustment and acts as a switch whereby the depression of key 120 or key 122 will effect engagement of either or both of the clutches 111, 623. To perform non-listing operations, the setting lever 627 is manually adjusted to its forward or non-list position, whereupon push-pull lever 626 will be lifted, moving the surfaces 630 and 633 out of co-operative relation with three-armed lever 631. Operation of push-pull lever 626, upon depression of an operating key 120 or 122, will now be idle with respect to operation of three-armed lever 631, and the listing mechanism, will, therefore, remain inoperative during the operation of the calculating cycle incident to the depression of said operating keys. The setting of lever 627 to non-list position will also shift the pin 682 of slide 680 (Fig. 16) to a position above the extension 689 of arm 670, and as said slide is moved downwardly upon the forward movement of rock lever 22 during a calculating cycle, pin 682 will rock the arm 670 to operate the clearout devices previously described.

Multiple cycle operations

Adjustment of the repeat non-repeat lever 600 to its rearward or repeat position will adjust the parts for continuous or multiple cycles of operation in the following manner:

Rearward adjustment of lever 600 moves slide 679 forwardly, carrying the lug of said slide from beneath arm 678 of the rock lever 22. Upon reciprocatory movement of said rock lever, during a calculating cycle, arm 678 will now fail to engage slide 679, so that the single cycle mechanism and the clearout mechanism operated by the slide 680 will not function. The calculator will thus continue to operate until the key 120 or 122 is released by the operator, whereupon the well-known full cycle stopping mechanism previously described will function to bring the parts to rest in full cycle position.

Single cycle listing with multiple cycle calculating operations

Multiplication and division operations in which the factors of the problem are to be printed may be done according to the several well known methods of full automatic or by semi-automatic operation. Applicant's co-pending application Serial No. 285,860, filed July 22, 1939, illustrates a mechanism which is intended to be combined with the devices shown herein for full automatic division. Applicant's co-pending application Serial No. 316,738, filed February 1, 1940, shows a mechanism to be further combined with the devices shown herein for full automatic multiplication. Applicant's Patent No. 1,566,650 shows a mechanism for doing multiplication and division by the semi-automatic method; that is, by manipulation of plus and minus power control keys, with any suitable means for decade shifting of the register carriage.

In any method of control of multiplying and dividing operations with the listing of the factors, the setting lever 627 should be placed in its middle (calculate and list) position, and the lever 600 in its rearward (repeat) position. If full automatic control is effected by the setting of a division or a multiplication key, the lever 600 may be automatically set in "repeat" position and the setting lever automatically shifted from its rearward (list only) to its middle (calculate and list) position, as will be shown hereinafter in connection with the automatic control of division by means of the key 210.

In order to illustrate other features of this invention which are useful in semi-automatic operations, multiplication is described as it would be done by using the plus bar (or the plus and minus bars 120, 122 if the well known system of short cutting by the semi-complemental method is used) together with any suitable means for shifting the carriage 2, as for example the carriage shifting keys 93, 94, illustrated in applicant's co-pending application Serial No. 347,920, filed July 27, 1940.

In semi-automatic control, the plus or minus bars may be depressed repeatedly in making a single calculation, but the listing mechanism must be operated but once to print the factor which is set in the keyboard. Consequently, means must be provided whereby the listing mechanism, having operated once, shall not operate upon subsequent key depressions necessary to the completion of the calculation.

It follows from the foregoing description that with the levers 600 and 627 preset as stated, depression of the plus bar 120 or the minus bar 122 shall initiate one cycle of operation of the listing mechanism, and one or more cycles of operation of the calculating mechanism. Since the one cycle listing action is slower than a single cycle of calculating action, and since one or more cycles of calculation may be called for, either action may terminate first. If but one or two cycles of calculating action are required in any decade position, the carriage may be shifted and the calculation resumed in the next place before the listing clutch has completed its one cycle of operation.

In order that the listing clutch shall be disabled after its initial operation in the performance of plural order calculations by the repeated depression of an operation key, a latch 690 (Fig. 12) is provided. This latch is pivoted on a stud 691 secured in the repeat, non-repeat lever 600, and is urged upwardly by a spring. Pin 692 secured in the setting lever 627 holds the latch 690 in its lowest position, as shown in Fig. 12, except when the setting lever 627 is in its middle position and the repeat, non-repeat lever 600 in its rearward (repeat) position, when a notch 693 of the latch will register with the pin, permitting the rearward end of the latch to bear against the lower face of a lug 694 of the three-armed lever 631. The lever 627 does not move forwardly far enough to permit pin 692 to overlie the notch 693 when the lever 600 is also in its forward position.

Now when the plus or minus bar is depressed to start a calculation with the notch 693 beneath the pin 692, the lug 694, in its rearward movement to effect engagement of the listing clutch, will free the latch 690, whereupon said latch will move upwardly under the influence of its spring into position in front of the lug.

This renders ineffective the one cycle listing clutch operating means, by preventing the return of the three-armed lever 631, so that no further operation of the listing clutch will occur until latch 690 is restored to its normal position. Any suitable means, operated upon the completion of a calculation and before a new calculation is started, may be used to restore the latch.

As shown link 695, slotted at one end for lost motion, connects the latch 690 with the keyboard clearing bail 58, upon operation of which the latch is released, permitting three-armed lever 631 to resume its normal position above the trigger 634. Therefore with the levers 600 and 627 set as required for calculating and listing operations, operation of bail 58, either by the depression of the clear key or by the depression of any total or sub-total key, will reactivate the listing mechanism.

As mentioned above, the use of this invention in any full automatic calculating and listing operations may be illustrated by reference to the action of the division key 210 (Figs. 1, 12, 16 and 19 and application Serial No. 285,860). The division key 210 is provided with a lug 697 which pushes lever 600 into its rearward (repeat) position when the division key is pressed rearwardly, and the movement of lever 600 to its rearward position takes the setting lever 627 out of its rearward (list only) position by contact of lever 600 with arm 698 of lever 627.

In order to provide for a one cycle listing operation when this division key 210 is pushed rearwardly to initiate a division operation, a ram 696 is pivoted upon the key and guided at its rearward end by a suitable guide plate fast to the framing of the machine. Ram 696 is normally positioned with a depending lug thereof in front of the projection 694 of the three-armed lever 631, so that as the division key 210 is pressed rearwardly, the lever 631 will be rocked, initiating a listing cycle of operation. In any operation in multiplication or division in which a motor key which controls the operation is set but once for the running of the entire calculation, the ram 696 will provide for one and only one printing cycle, to record one of the factors, the latch 690 not being necessary for this purpose. However, the above described action of latch 690 is essential if the motor control key is to be set more than once in a given calculation. It may occur in division, for example, that the key 210 is restored manually before the machine has run to its full quotient capacity, whereupon the operator decides that more digits are needed in the quotient, so resets the division key 210 into operative position to restart the machine. In this case latch 690 will hold lever 631 set when the division operation is first terminated by the manual restoration of the division key, so that the second setting of said key, to continue the same calculation, does not initiate another cycle of listing operation. When the division key 210 if finally restored, and the keyboard clearing bail 58 is operated, lever 631 will resume its normal position ready for the initiation of the next listing operation.

The ram 696 and the push pull lever 626 must of course both be disabled whenever the setting lever 627 is shifted into its forward (calculate only) position. Therefore the ram 696 is provided with a flange which overlies the upper end of push pull lever 626, whereby, upon lifting of the latter by lever 627, so that it will not contact lever 631, the ram 696 is also lifted to ineffective position.

In the use of the invention with full automatic multiplication, that is, in a machine having a motor control key one depression of which will initiate an operation involving two or more multiplier digits and one multiplicand printing action, the operation key may be provided with control connections similar to those provided for the full automatic division key 210. That is to say, the multiplication key should be provided with an independent ram action equivalent to that of ram 696, as well as connections to set lever 600 into repeat position, and lever 627 from "list only" into "calculate and list" position.

*Multiplier-quotient register*

The multiplier-quotient counting register 306 (Figs. 1 and 22) is mounted in the base of the machine and is similar in design to the numeral wheels 473 in the carriage, being equipped with the same tens transfer mechanism, similarly shifted into crawl position during machine operation.

A series of counting fingers 307 are provided as shown in Figs. 15 and 22, there being a counting finger for each counting wheel provided in the machine; however, but one of these fingers may operate at a time, as hereinafter described. Counting fingers 307 are suported upon an eccentrically operated shaft 312 driven in cycle with the differential actuators. The usual reversing gearing (shown, for instance, in application Serial No. 347,920, hereinbefore referred to) may be provided operable by the change lever 90 (Fig. 1) in the well known manner.

Counting fingers 307 are fulcrumed about a fixed rod 313, a suitable slot allowing for a pivotal upward and downward movement of said fingers.

During the operation of shaft 312 a spring 314 will draw the tooth of the active counting finger into the gear 306 to register cycles of operation on the related counting wheel 305. Supported in the framing of the machine is a vernier slide 315 (Figs. 15 and 22) provided with notches adapted to cooperate with the counting fingers in the following manner:

If the counting register has ten numeral wheels with a counting finger for each, the notches will be spaced ten-ninths of a column space apart, so that with the numeral wheel carriage in its extreme left hand position, a notch will be in alignment with the counting finger 307 of the units order, permitting that finger to operate, while the notches of the higher orders will be out of alignment with the related counting fingers in progressive degrees. During the operation of shaft 312 the lower ends of all save the units order of said fingers will engage slide 315, said fingers moving in a vertical plane only, free of the gears 306.

Pivotally mounted (Fig. 15) upon a bracket fast to the framing of the machine is a bell crank lever 318 having pin and slot connection with vernier slide 315, which is impelled toward the left side of the machine by a spring 316. The bell lever is provided with a roller which, by this spring action, is impelled against a stepped plate 317 fast to the back plate of the numeral wheel carriage 2. As the numeral wheel carriage is shifted toward the right (toward the left in Fig. 15 which is a rear view), plate 317 will rock bell crank 318, moving vernier slide 315 one-ninth as far as the carriage movement in the same direction, so that as the carriage is shifted from column to column the counting fingers will be successively freed to operate, from right to left.

*Listing values from registers*

Any value (total, product, remainder, etc.) registered upon the numeral wheels 473, and any value (multiplier, quotient, etc.) registered upon the numeral wheels 305 may be printed by the operation of suitable total and sub-total keys 700, 701, 702, 703 (Figs. 1, 12, 18 and 19), the keys 700, 701 being related to the wheels 473 and the keys 702, 703 related to the wheels 305. Each of the above keys is provided with an offset projection 704, adapted to cooperate with related slides 705. These slides are similar in structure, those related to the keys 700, 701 (Fig. 19) being pivotally connected at 706 (Fig. 12) with a bell crank 707 loosely mounted upon the shaft 45 of the differential actuating mechanism previously described, said bell crank being related to the register 473. The slides related to the keys 702 and 703 are similarly connected to a corresponding bell crank 708 (Fig. 19) related to the register 305 through the connecting link 709 illustrated in Figs. 12 and 19.

Pivotally mounted at 632 (Figs. 12 and 19) upon the main frame is a bail 710 (Figs. 12, 18 and 19), which extends beneath the slides 705 and the lower arm 711 of which engages a bell crank lever 712 (Fig. 12) pivotally mounted upon shaft 125 and having engagement with an arm 713 of the keyboard clearout bail 58. Bail 710 is normally positioned above the trigger 634 of the clutch detent 635 so that the depression of any one of the total keys clears the keyboard and causes the operation of the one cycle clutch 623. As previously described, fast to the driven member of clutch 623 are positive motion cams 645 and 674 (Figs. 3, 12 and 18). The cams 645 impart counter-clockwise movement to rocker 643 at the starting of a cycle and restore said rocker at mid-cycle, to provide for a total taking operation. The rocker 676 related to the cams 674 is rocked counter-clockwise at the starting of a cycle of operation and held in rocked position throughout the cycle, providing for a sub-total operation. Each of the slides 705 is provided with a notch 714 (Figs. 3 and 12), the notches of the slides related to keys 700, 702 being adapted to engage the total taking rocker 643, while the notches 714 of the slides related to keys 701, 703 may engage the sub-total rocker 676.

Upon depression of the total key 700 the notch 714 of the related slide 705 will engage the rocker 643 and as said rocker is operated, the slide will be moved forwardly, imparting a clockwise movement to the bell crank 707 related to the register 473. Fast upon the rearwardly extending arm of bell crank 707 and further supported by arms pivotally mounted upon the shaft 45 (Fig. 22) are shafts 715 supporting a series of gear trains 716, meshing with the output gears 201 of the related differential actuator units. Upon operation of bell crank 707, the gear trains 716 will be rocked downwardly, into mesh with the related gears 606 of the lister driving means previously described.

Since both input legs of the differential actuator gearing are normally locked, preventing rotation of the output gear 201 (Fig. 3) it is necessary to unlock one of the input legs of each differential unit in order to rotate the output gear during the taking of totals and sub-totals from the register 473. This is done by lifting the previously described spring urged pawl 64, which is provided with an upstanding arm 66 which bears against a hub of one of the gears 716, the downward movement of this gear serving to disengage the pawl.

Fast to each end of one of the shafts 715 is a pinion 717 having engagement with a rigidly mounted toothed segment 718, so that as bell crank 707 is rocked an equal movement of the gear trains 716 will be insured.

Bell crank 707 is provided with a forwardly extending arm positioned beneath a universal bar 719, pivotally mounted upon the shaft 481 and provided with a series of stop projections normally lying out of the path of movement of pins 487 (Figs. 12 and 14) fast to the numeral wheels 473. Rocking of bell crank 707 will lift bar 719 and bring the stop projections into the path of movement of the pins 487, so that they will arrest the register wheels as they are rotated subtractively to zero by the operation of the gears 606 of the lister drive mechanism, thereby limiting the movement of the type bars 603 in accordance with the value of the total.

The slide 705 will be held in depressed position, if the operator releases key 700 prematurely, by engagement of a lug 720 of said slide with the lower face of bracket 687.

As described with relation to plus and minus bar operation, pin 684 will disengage trigger 634 (Fig. 12) from bail 710 to provide for single cycle operations if one of the keys 700—703 is held depressed by the operator after the operation has been completed.

At mid cycle of the total taking operation rocker 643 will restore slide 705 to its normal position, disengaging the gear trains 716 from the gears 606 and also allowing withdrawal of the stop projections out of the path of movement of the pins 487, by the spring (not shown) of bar 719, the parts being held in normal position by a suitable spring tensioned locator 721.

Since in total or sub-total operations all the listing racks 601 must be free to move forwardly, the following means will hold the zero latches 639 out of engagement. Bail 710 (Fig. 12) has a lost motion link connection 722 with universal bar 641 and as said bail is rocked clockwise upon depression of any total or sub-total key the lost motion will be taken up and said link will hold bar 641 in its normal lower position during total or sub-total cycles of operation, rendering the zero latches inoperative (Fig. 22).

Depression of key 701 for a sub-total operation will engage the notch 714 (Fig. 3) of the subtotal slide with rocker 676, whereupon the parts will function as described for total operations, except that the cams 674 which operate the rocker 676 will hold gear trains 716 in engagement with the gears 606 during the forward and return movement of the listing racks and associated parts, so that the register wheels 473 will be restored to their previous reading after the subtotal is printed.

The taking of totals and sub-totals from the register 305 is effected in substantially the same manner as from the register 473, the keys 702 and 703 (Figs. 1, 12, 18 and 19) clearing the keyboard, holding out the column latches 639, and operating the one cycle clutch in exactly the same way. The previously described link connection 709 (Figs. 12 and 19), which is pivoted on the rearward end of bell crank 708 and which is operated only by the keys 702 and 703, engages the gears 306 (Fig. 22) with the gears 612 of the listing drive, in a manner similar to the engagement of the gears 716 with gears 606, except that the gear 306 is normally positioned by a click pawl so need not be unlocked as it is moved into mesh with gear 612. The zero stops 723 are set in a manner similar to the setting of bar 719.

List-only or non-calculating operations

For non-calculating (list only) operations setting lever 627 will be adjusted rearwardly, whereupon pin 682 (Fig. 16) will engage the spur of coupling latch 130, disengaging said latch from the calculator clutch setting lever 128, thereby rendering the calculating means inoperative. In this adjustment of setting lever 627 to its rearward position, push-pull lever 626 (Fig. 12) is rocked downwardly, but the surfaces 630 and 633 of said lever still remain in cooperative relation with the bell crank 631 of the lister cycle operating means. Upon depression of an operating key 120, 122, therefore, a listing cycle only will be initiated.

Provision may be made whereby the keyboard shall be invariably cleared after any single cycle of non-calculating (listing only) operation. For this purpose, the forwardly extending arm 698 of the setting lever 627 (Fig. 12) underlies an arm of the repeat, non-repeat key 600, so that the latter shall be invariably set forwardly in its non-repeat position when the setting lever is positioned in its rearward position. Conversely, as previously stated, the setting of lever 600 to repeat position will move the setting lever 627 from its "list only" position to the intermediate or calculate-and-list position.

Operation and uses

The operation of the machine illustrated as embodying this invention is as follows:

*Addition.*—If the repeat, non-repeat lever is positioned forwardly for non-repeat operations and the setting lever 627 is in its forward (calculate only) position, a value set into the keyboard and the plus bar depressed, that value will be added to the register 473, the keyboard will be cleared and the machine will come to rest at the end of the first cycle of operation, even if the plus bar is held depressed after the registration is completed. If lever 600 is in the non-repeat position and lever 627 in its middle (calculate and list) position an addition will be made as above described, except that the item which was set into the keyboard will be printed upon the paper which has been inserted into the platen carriage 724.

If the plus bar is operated with the lever 627 in its middle position and the lever 60 set for repeat operation, it will be necesary to depress the keyboard clearing key 61 before setting another item into the keyboard in order to reactivate the printing mechanism for the printing of the next item.

After several items have been added a total or subtotal may be taken in the well known manner by the depression of the motorized total or subtotal keys 700 or 701 respectively.

*Subtraction.*—If the machine is operated in the several ways above outlined for addition, except that the minus bar 122 is depressed instead of the plus bar, the operations will be identical except that the the values set into the keyboard will be subtracted from the register 473 instead of added. Of course, additions and subtractions may be intermingled and the balance registered and printed as a total or sub-total.

*Multiplication.*—Lever 600 at repeat, lever 627 is at its forward position for calculate only. The multiplicand is placed in the keyboard. The plus bar is depressed and held for the required number of cycles for each digit of the multiplier, shifting the carriage between the computations by each multiplier digit by the depression of shift key (93 or 94), the product being registered upon the numeral wheels 473. After the product is read and copied by the operator, these wheels may be turned to zero by any suitable zero setting mechanism, such as that shown in application Serial No. 321,732, hereinbefore referred to, or the wheels 473 may be cleared to zero in the usual manner of total taking by means of the total key 700, in which case the product would be printed. During this multiplying operation the change lever 90 (Fig. 1) for the multiplier register 305 should be positioned forwardly, as required for multiplication. During the operation the multiplier is registered on the numeral wheels 305, from which it may be checked and these wheels restored to zero by suitable clearing means, or by depressing the total key 702, which would cause the multiplier to be printed.

If the setting lever 627 is preset to its middle (calculate and list) position and an operation in multiplication performed as above, the multiplicand will be printed the first time the plus bar is depressed. Upon the completion of the problem the total key 702 may be depressed to print the multiplier and then the total key 700 depressed to print the product. Of course, the subtotal keys 703 or 701 may be depressed instead of the total keys if the multiplier or product values are for any reason to be retained in their respective registers. The first depression of any total or sub-total key after a multiplication clears the multiplicand from the keyboard. Before taking a total or sub-total from the register 473, the operator should, of course, position the register carriage 2 so that the decimal point of the value registered therein is in the proper position for printing.

Multiplications may be performed by using the plus and minus bars to control machine cycling according to the customary method of semi-complemental calculation, to "short cut" the operation. If that is done a multiplier is registered on the numeral wheels 305 as before and both factors and the product will be printed in the same manner, irrespective of the key (120 or 122) which is first depressed.

*Other methods of multiplication.*—This invention may be used in combination with any of the known systems of automatic or semi-automatic multiplication. For example, if a column of multiplier keys are provided to determine machine cycling, the action of the mechanism of this application would be substantially the same as described with plus, minus bar control.

If it is combined with a mechanism in which the multiplier is fully preset so that a single multiplication key initiates the whole operation of multiplication, as set forth in applicant's co-pending application Serial No. 316,738, the multiplier would be first set into the keyboard and printed by the mechanism of this invention as a multiplier value is stored in the multiplier control mechanism; whereupon the keyboard would be cleared by the depression of the clear key 61 and the multiplicand set into the keyboard and the multiplying key depressed, which would cause the multiplicand to be printed and the operation to be completed. Then the total key 700 or the sub-total key 701 would be depressed to print the product and clear the keyboard. With the construction as shown, a multiplier would appear in the register 305 after the completion of a calculation, and if it were desired to print the multiplier after instead of before the printing of the multiplicand, the setting lever 627 would be left in its forward (calculate only) position during the storage of the multiplier in the controlling mechanism, the multiplier being printed after the completion of the problem and before the printing of the product by the depression of the total key 702.

*Division.*—The lever 98 is positioned rearwardly to provide for reverse sign operation of the quotient register 305 as required for division operations. The levers 600 and 627 are set for repeat and calculate-only or repeat and calculate-and-list operations, as desired. Since this invention has utility only with the latter, this description will be confined to that mode of operation. With the carriage positioned toward the right, to allow for the desired number of digits in the quotient, the dividend is set into the keyboard and turned into the register 473 and printed, by depressing the plus bar 120. The keyboard is then cleared by depressing the clear key 61 and the divisor is set into the keyboard. Upon setting the division key 210 rearwardly to initiate the division operation, the divisor is printed by one cycle of operation of the listing mechanism, and the division operation is carried through, registering the several digits of the quotient to the capacity of the machine, whereupon division key 210 is automatically returned to its normal position and the machine brought to rest with the quotient showing in the register 305 and the remainder in the register 473. The quotient may be printed by depressing the total key 702 or the sub-total key 703 and the remainder by depressing the total key 700 or the sub-total key 701.

In connection with multiplication and division, it may be noted that the provision of separate driving means for the differential register actuators and for the printing means allows the register carriage to be shifted to a new decade during any portion of the type setting and printing cycle. According to the showing the platen carriage is to be shifted by hand, but obviously any of the well known programme mechanisms may be used, to provide automatic placement of that carriage.

*List-only operation.*—If the setting lever 627 is placed in its rearward position for "list only" operation, the lever 600 is thereby set for non-repeat operations. The calculating mechanism will not be operated at all and the keyboard will be automatically cleared after each cycle operation of the listing mechanism by the plus, minus bars, the only function performed being the printing on paper of a value set in the keyboard.

*Non-print.*—It may be noted that in the operation of the machine by any motor key (other than the total or sub-total keys) with the setting lever 627 in its forward (calculate only) position and with the lever 600 set either in its repeat or non-repeat position, the action is somewhat like the "non-print" action of the well known listing machines in that registrations will be made on the numeral wheel but no printing will occur.

I claim:

1. In a listing calculator, the combination with value entering devices, calculating means including differential actuators settable under control of said entering devices, and a register; and printing means including type bars settable under control of the value entering devices; of motor drive means, a clutch connecting the actuators with the drive, a clutch independently connecting the printing means with the drive, an operation key, clutch control means designed for operation by said key to effect plural cycle operation of the differential actuators and single cycle operation of the printing means and including independently adjustable elements, and a switch settable to adjust the elements of the control means to connect the key with the actuator clutch only, the printing clutch only or concomitantly with both clutches.

2. In a listing calculator, the combination with value entering devices, calculating means including a register, cyclic differential actuators therefor settable under control of said entering devices, and printing means including type bars settable under control of the value entering devices; of motor drive means, a clutch connecting the actuators with the drive, a clutch connecting the printing means with the drive, an operation key, clutch control means designed for operation by said key to effect plural cycle operation of the differential actuators and concomitant single cycle operation of the printing means and including printing clutch engaging elements, and a switch settable to disable said elements.

3. In a listing calculator, the combination with value entering devices, calculating means including differential actuators settable under control of said entering devices, and a register, and printing means including type bars settable under control of the value entering devices; of motor drive means, a clutch connecting the actuators with the drive, a clutch independently connecting the printing means with the drive, operation keys, clutch control means designed for operation by said keys to effect plural cycle operation of the differential actuators and single cycle operation of the printing means and including a member operable by said keys in one or alternatively in the other direction from neutral position to engage the calculating clutch and determine additive or subtractive operation of the differential actuators, a member having pivotal connection with the actuator clutch engaging member and operable thereby in one or alternatively in the other direction from neutral position to engage the printing clutch, a switch lever fulcrumed coaxially with the pivotal connection of the printing clutch engaging member in its neutral position and having engagement with said last named member to adjust the same pivotally to non-operative position in the adjustment of said lever in one direction from neutral position, and means operable by the switch lever in the adjustment thereof in the opposite direction from neutral position to render the actuator clutch member ineffective to engage the clutch.

4. In a listing calculator having printing means and motor drive means; a clutch connecting the printing means with the drive, a plurality of operation keys; control means designed for operation by said keys and including printing clutch engaging elements individual to the operation keys, and a switch settable to disable both of said individual elements.

5. In a listing calculator, the combination with settable value entering devices, clearout means therefor, settable repeat, non-repeat devices for operating the clearout means, calculating means including differential actuators settable under control of said entering devices, and a register; and printing means including type bars settable under control of the value entering devices; of drive means having high speed connections with the differential actuators and independent low speed connections with the printing means, control devices for the drive connections and including elements operable to effect a number of continuous cycles of operation of the actuators and independently adjustable elements, and a switch settable to adjust the elements of the control means to connect the drive with the actuators only, with the printing means only or concomitantly with the actuators and printing means, said switch and repeat, non-repeat devices being designed to cooperate to set the switch from printing only to actuation and printing position upon setting of the devices for repeat, and to set the devices to non-repeat position upon setting of the switch for printing only.

6. In a listing calculator, the combination with settable value entering devices, clearout means therefor, settable repeat, non-repeat devices for operating the clearout means, calculating means including a register, cyclic differential actuators therefor settable under control of said entering devices, and printing means including type bars settable under control of the value entering devices; of motor drive means, a clutch connecting the actuators with the drive, a clutch connecting the printing means with the drive, a clutch control means designed for operation to effect plural cycle operation of the differential actuators and concomitant single cycle operation of the printing means and including independently adjustable elements, a switch settable to adjust the elements of the control means to effect calculation or alternatively to effect printing only, and an operation key manipulable to set the repeat, non-repeat devices to repeat position, and to set the switch to calculate position.

7. In a listing calculator, the combination with settable value entering devices, clearout means therefor, settable repeat, non-repeat devices for operating the clearout means, calculating means including a register, cyclic differential actuators therefor settable under control of said entering devices, and printing means including type bars settable under control of the value entering devices; of motor drive means, a clutch connecting the actuators with the drive, a clutch connecting the printing means with the drive, clutch control means designed for operation to effect plural cycle operation of the differential actuators and concomitant single cycle operation of the printing means and including independently adjustable elements, and a switch settable to adjust the elements of the control means to effect calculation or alternatively to effect printing only, said switch including an element acting in one set position to prevent operation of the actuator clutch and in another set position cooperating with the set non-repeat devices to limit the differential actuators to a single cycle of operation.

8. In a listing calculator, the combination with settable value entering devices, calculating means including a register, cyclic differential actuators therefor settable under control of said entering devices, and printing means including type bars settable under control of the value entering devices; of motor drive means, a clutch connecting the actuators with the drive, a clutch connecting the printing means with the drive, clutch control means designed for operation to effect plural cycle operation of the differential actuators and concomitant single cycle operation of the printing means and including independently adjustable elements, a switch settable to adjust the elements of the control means to connect the drive with the actuators only, with the printing means only or concomitantly with the actuators and printing means, and clearout means for the value entering devices comprising a member operating in timed relation with the differential actuators, a member operating in timed relation with the printing means, value clearing elements, and non-repeat control devices settable to provide for operation of said elements by one only of said timed members in any set position of the switch.

9. In a listing calculator, the combination with settable value entering devices, clearout means therefor, calculating means including a register, cyclic differential actuators therefor settable under control of said entering devices, and printing means including type bars settable under control of the value entering devices; of motor drive means, a clutch connecting the actuators with the drive, a clutch connecting the printing means with the drive, clutch control means including independently settable elements, a switch settable to adjust the elements of the control means to connect the drive with the actuators only, with the printing means only or concomitantly with the actuators and printing means, and repeat, non-repeat means comprising a member operating in timed relation with the differential actuators, a member operating in timed relation with the printing means, a slide pivotally adjustable in the setting movement of said switch and provided with a projection, a coupling for the actuator clutch controlling elements having an arm lying in the path of sliding movement of said projection, a settable control member having connection with the clearout means, a projection from said member settable into or alternatively out of the path of movement of the timed printing member and a projection from said member settable into or alternatively out of alignment with the projection of the slide in the calculate only position of the switch, and a second control member settable in unison with the first named control member, having a transversely adjustable connection designed to operate the slide and a projection settable into or alternatively out of the path of movement of the timed actuator member.

10. In a listing calculator, the combination with settable value entering devices, clearout means therefor, calculating means including a register, cyclic differential actuators therefor settable under control of said entering devices, and printing means including type bars settable under control of the value entering devices; of motor drive means, a clutch connecting the actuators with the drive, a clutch connecting the printing means with the drive, clutch control means designed for operation to effect plural cycle operation of the differential actuators and concomitant single cycle operation of the printing means, and repeat, non-repeat mechanism including a member operating in timed relation with the printing means to operate the clearout means, a member operable in timed relation with the differential actuators, auxiliary clutch control means operable by said last named member to limit the differential actuators to a single cycle of operation and means settable to maintain the clearing means and the single cycle means alternatively in or out of operative relation with the two timed members.

11. In a listing calculator, the combination with value entering devices, calculating means including a register, cyclic differential actuators therefor settable under control of said entering devices; and printing means including type bars settable under control of the value entering devices; of motor drive means, a clutch connecting the actuators with the drive, a clutch connecting the printing means with the drive, an operation key, clutch control means designed for operation by said key to effect plural cycle operation of the differential actuators and concomitant single cycle operation of the printing means including coupling connections between the key and the clutches, and means operable to hold the printing clutch coupling released during repeated operation of the clutch control means to effect actuator cycling.

12. In a listing calculator, the combination with value entering devices, clearout means therefor, settable repeat, non-repeat devices for operating the clearout means, calculating means including a register and cyclic differential actuators therefor settable under control of said entering devices, and printing means including type bars settable under control of the value entering devices; of motor drive means, a clutch connecting the actuators with the drive, a clutch connecting the printing means with the drive, an operation key, clutch control means designed for operation by said key to effect plural cycle operation of the differential actuators and concomitant single cycle operation of the printing means including coupling connections between the key and the clutches, and normally inoperative means settable to operative position by the repeat, non-repeat devices in the repeat setting thereof and operable at the end of the first listing cycle to hold the printing clutch coupling released during repeated operation of the clutch control means to effect actuator cycling.

13. In a listing calculator, the combination with settable value entering devices, clearout means therefor, calculating means including a register, cyclic differential actuators therefor settable under control of said entering devices; and printing means including type bars settable under control of the value entering devices; of motor drive means, a clutch connecting the actuators with the drive, a clutch connecting the printing means with the drive, an operation key, clutch control means designed for operation by said key to effect plural cycle operation of the differential actuators and concomitant single cycle operation of the printing means including coupling connections between the key and the clutches, a latch operable to hold the printing clutch coupling released during repeated operation of the clutch control means to effect actuator cycling, and devices operable by the clearout means to release said latch.

14. In a listing calculator, the combination with value entering devices, calculating means including differential actuators settable under control of said entering devices, and a register having numeral wheels; and printing means including type bars settable under control of the value entering devices; of motor drive means, a clutch connecting the printing means with the drive, an operation key, clutch control means designed for operation by said key to effect operation of the differential actuators and of the printing means including coupling connections between the key and the clutch; means operable upon operation of the printing clutch to disable the related coupling, and total control means including a total key operable to connect the register wheels with the type bars, to engage the printing clutch and to reenable the coupling thereof.

15. In a listing calculator, the combination with value entering devices, a lock operable to prevent readjustment of said devices, calculating means including differential actuators settable under control of said entering devices, and a register; and printing means including type bars settable under control of certain of the value entering devices; of motor drive means, a clutch connecting the actuators with the drive, a clutch connecting the printing means with the drive, an operation key, clutch control means designed for operation by said key to effect plural cycle operation of the differential actuators and concomitant single cycle operation of the printing means, means operable by the actuator clutch to maintain engagement of the lock with the value entering means, and devices independently operable by the printing clutch to maintain said engagement.

16. In a listing calculator, the combination with value entering devices, calculating means including differential actuators settable under control of said entering devices and including each a plurality of normally locked gear trains, and a register having numeral wheels; and printing means including type bars settable under control of the value entering devices; of motor drive means, a clutch connecting the printing means with the drive, total control means including normally inoperative zero stops for the register wheels, a total key operable to engage the printing clutch, and means controlled by said total key to render the zero stops effective, to unlock a gear train of each differential actuator, and to connect the differential actuators with the type bars.

17. In a listing calculator, the combination with value entering devices, a lock for said devices, calculating means including differential actuators having elements settable under control of said entering devices and including each a plurality of normally locked gear trains, and a register having numeral wheels; and printing means including type bars settable under control of the value entering devices; of motor drive means, a clutch connecting the printing means with the drive, and total control means including normally inactive zero stops for the register wheels, a total key operable to engage the printing clutch, and means controlled by said total key to render the zero stops effective, to unlock a gear train of each differential actuator, to engage the lock with the value entering devices, and to connect the differential actuators with the type bars.

18. In a listing calculator, the combination with value entering devices, calculating means including a register having numeral wheels, cyclic differential actuators therefor settable under control of said entering devices; and printing means including type bars settable under control of the value entering devices; of motor drive means, a clutch connecting the printing means with the drive, and total control means including normally inoperative zero stops for the register wheels, a total key operable to engage the printing clutch, and means controlled by said total key to render the zero stops effective and to connect the differential actuators with the type bars.

19. In a listing calculator having a register provided with numeral wheels, calculating means including multicyclic differential actuators for said wheels, and printing means including type bars and drive means for said type bars said actuators and drive means being each operable independently of the other; normally disengaged means for rotatably connecting the numeral wheels with the type bars, means operable to remove the numeral wheels from the control of said calculating means and connect said wheels with the type bars through the normally disengaged means, and total control devices operable in said connected condition of said wheels and including normally inactive zero stops for the wheels, means for moving said stops to active position, and means for effecting movement of said drive means to rotate said wheels against the zero stops.

20. In a listing calculator having a register provided with numeral wheels, calculating means including differential actuators for said wheels, drive means engageable with said actuators and detents for said numeral wheels, and printing means including type bars; total control devices including normally disengaged means for rotatably connecting the actuators with the type bars, and means operable to disengage the differential actuators from the drive, to lift the detents and to connect said actuators with the type bars through the normally disengaged means.

GEORGE C. CHASE.